(12) United States Patent
Sasaki et al.

(10) Patent No.: US 8,077,433 B2
(45) Date of Patent: Dec. 13, 2011

(54) THIN-FILM MAGNETIC HEAD, METHOD OF MANUFACTURING THE SAME, HEAD GIMBAL ASSEMBLY, AND HARD DISK DRIVE

(75) Inventors: Yoshitaka Sasaki, Santa Clara, CA (US); Hiroyuki Ito, Milpitas, CA (US); Atsushi Iijima, Shatin (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 862 days.

(21) Appl. No.: 12/132,368

(22) Filed: Jun. 3, 2008

(65) Prior Publication Data
US 2009/0296275 A1   Dec. 3, 2009

(51) Int. Cl.
*G11B 5/17* (2006.01)
(52) U.S. Cl. .................................................. 360/123.15
(58) Field of Classification Search ............. 360/123.15, 360/123.16, 125.35
See application file for complete search history.

(56) References Cited

U.S. PATENT DOCUMENTS

| 4,656,546 A | 4/1987 | Mallory |
| 4,672,493 A | 6/1987 | Schewe |
| 5,995,342 A * | 11/1999 | Cohen et al. ............. 360/125.35 |
| 6,504,675 B1 | 1/2003 | Shukh et al. |
| 6,927,939 B2 | 8/2005 | Sasaki et al. |
| 6,950,279 B2 | 9/2005 | Sasaki et al. |
| 6,987,645 B2 | 1/2006 | Sasaki et al. |
| 7,430,098 B1 * | 9/2008 | Song et al. .................. 360/294.7 |
| 2004/0085684 A1 * | 5/2004 | Basra et al. .................... 360/317 |
| 2009/0279207 A1 * | 11/2009 | Sasaki et al. ............. 360/125.03 |

FOREIGN PATENT DOCUMENTS

| JP | A-2003-242610 | 8/2003 |
| JP | A-2004-094997 | 3/2004 |

* cited by examiner

*Primary Examiner* — Angel A. Castro
(74) *Attorney, Agent, or Firm* — Oliff & Berridge, PLC

(57) ABSTRACT

A thin-film magnetic head is constructed such that a main magnetic pole layer having a magnetic pole end face on a side of a medium-opposing surface opposing a recording medium, a write shield layer opposing the main magnetic pole layer on the medium-opposing surface side, a gap layer formed between the main magnetic pole layer and write shield layer, and a thin-film coil wound about the write shield layer or main magnetic pole layer are laminated on a substrate. This thin-film magnetic head has an equidistant two-stage structure in which a first turn part of a first conductor layer and a second turn part of a second conductor layer overlap vertically along the medium-opposing surface while having the same front distance from respective front side faces closer to the medium-opposing surface to the medium-opposing surface.

20 Claims, 28 Drawing Sheets

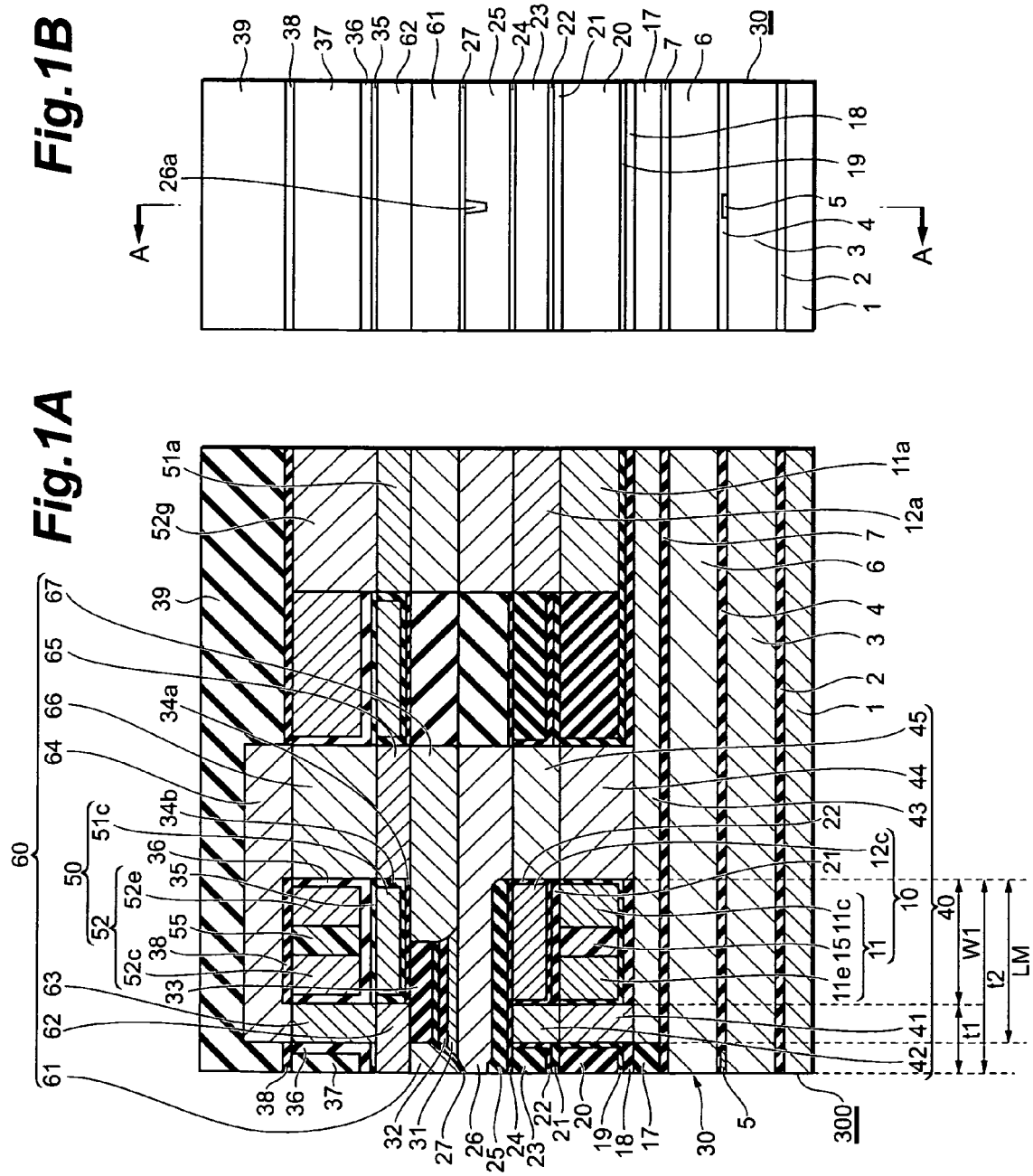

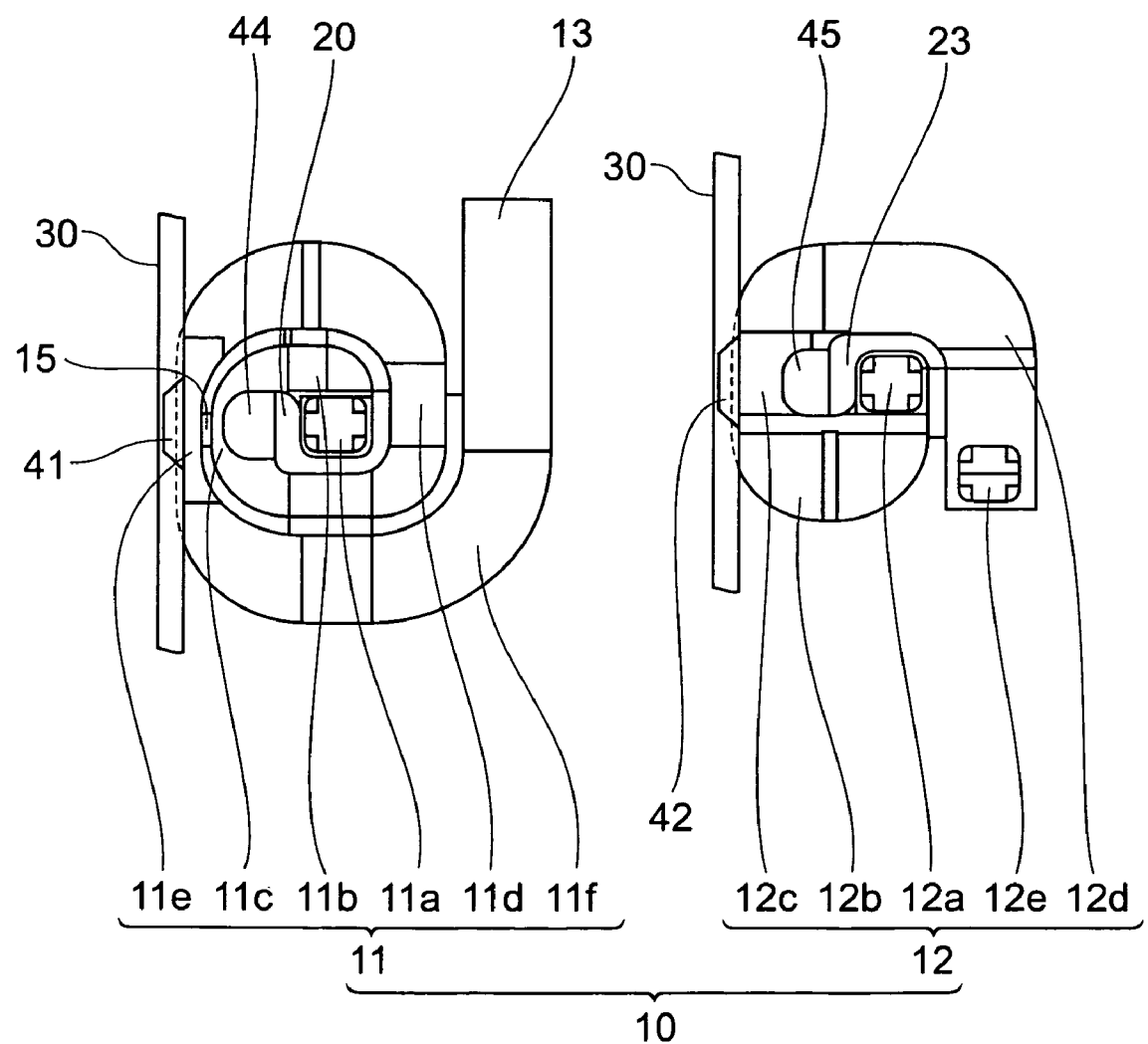

Fig.3A
Fig.3B
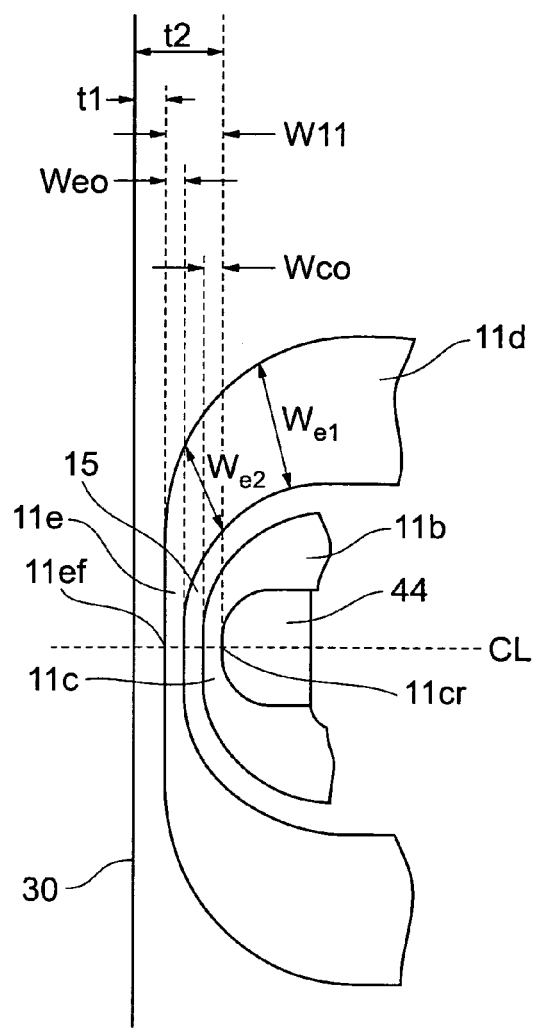
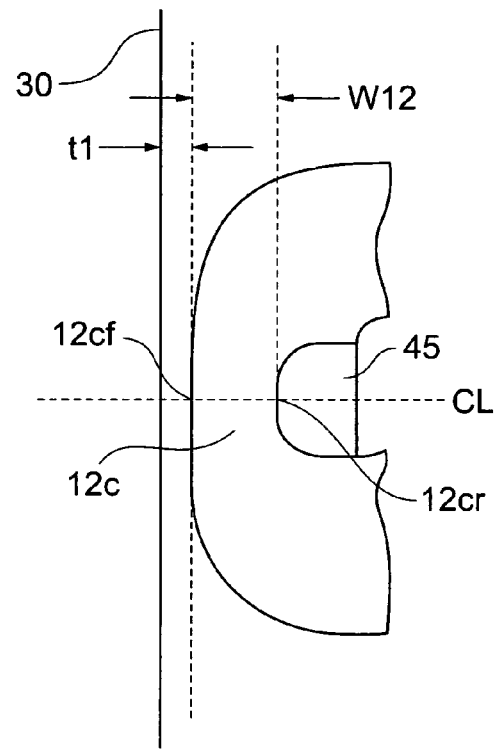

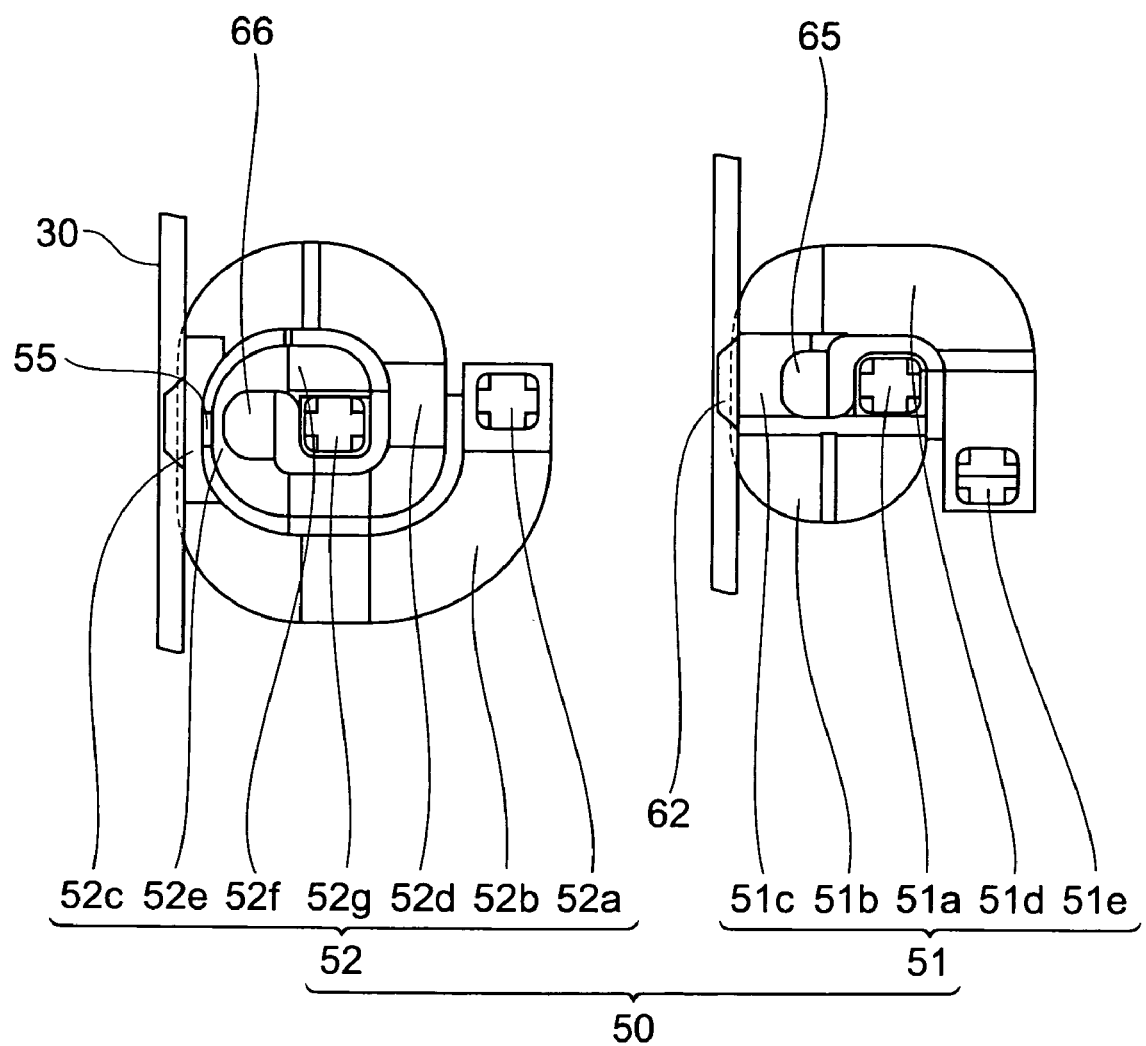

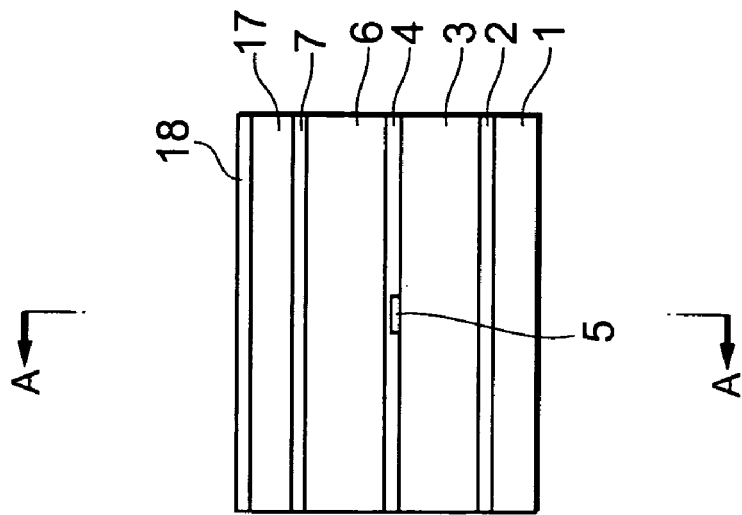
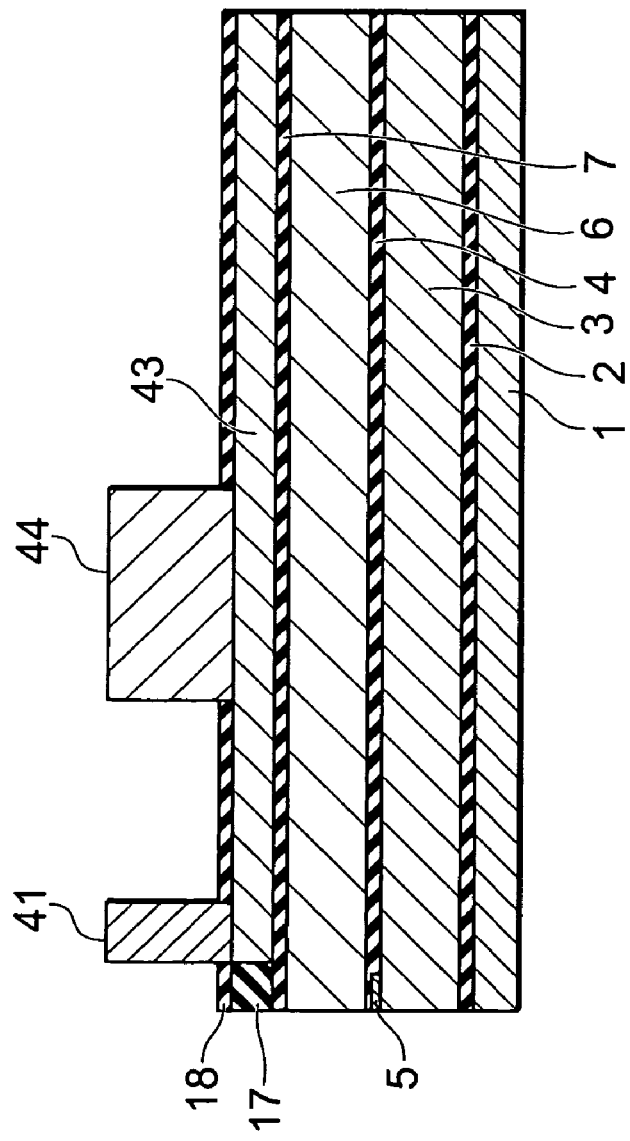
Fig. 5A
Fig. 5B

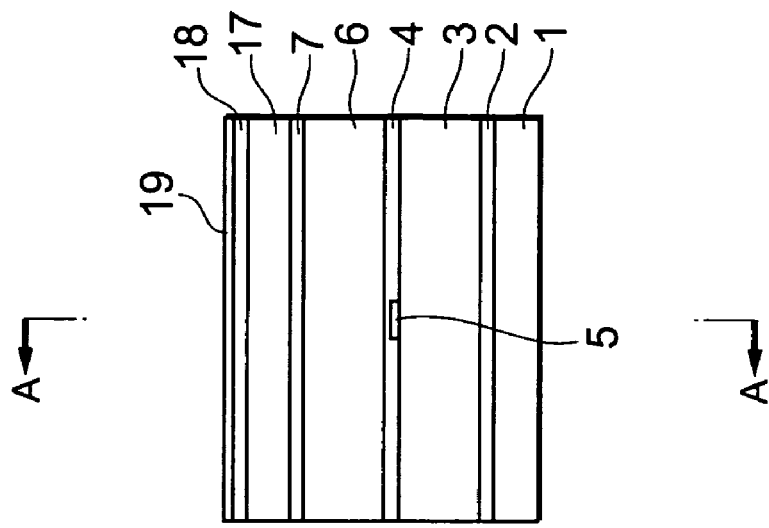
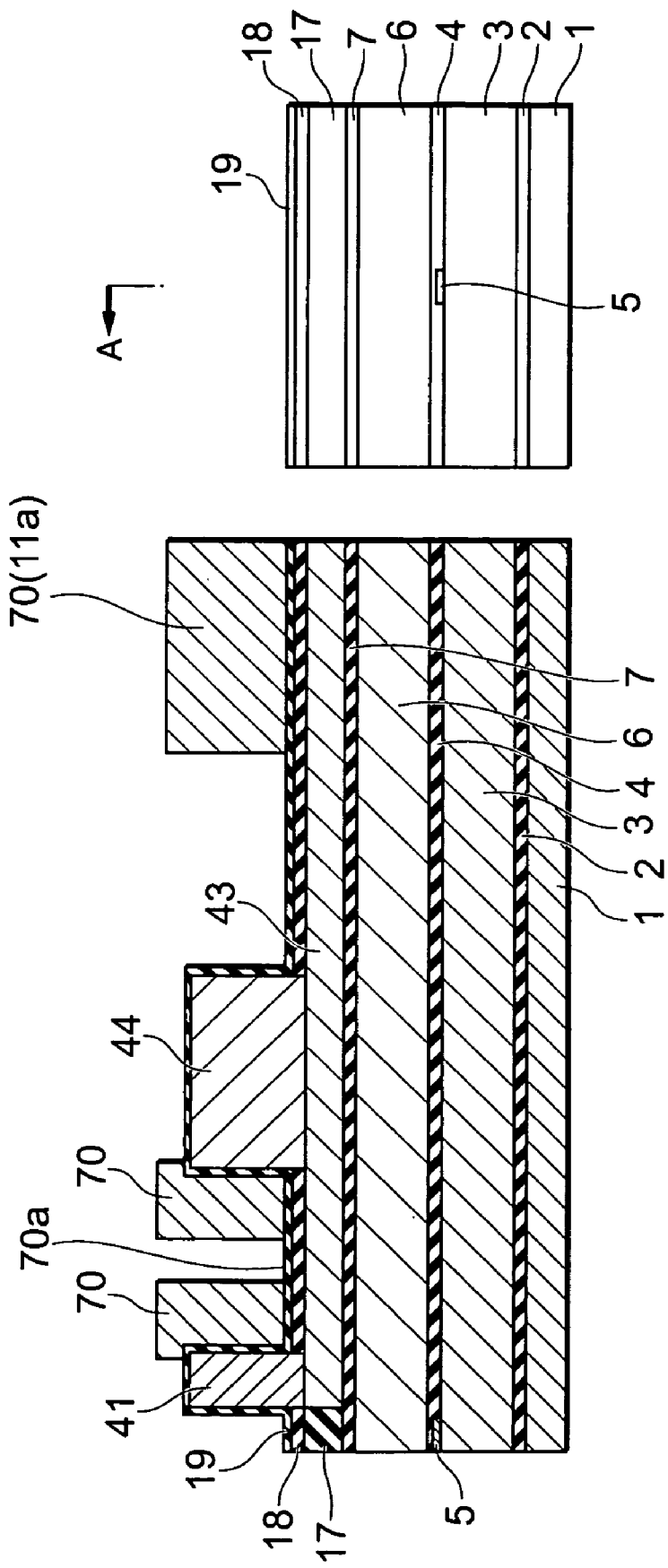

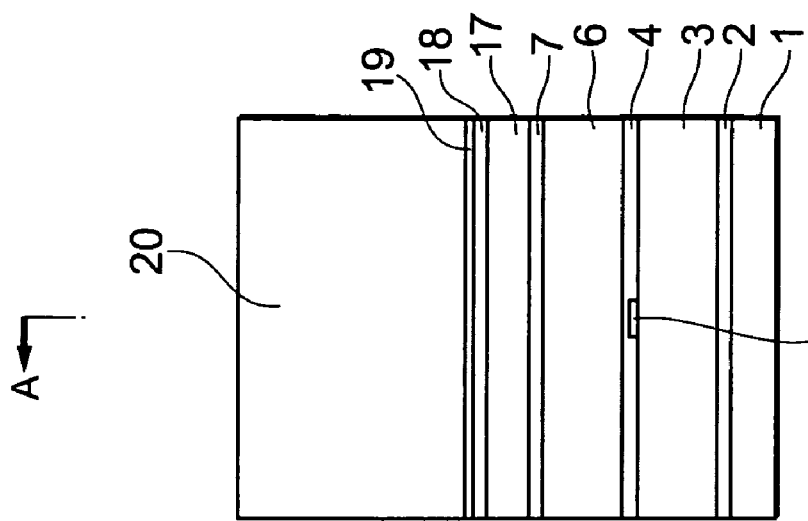
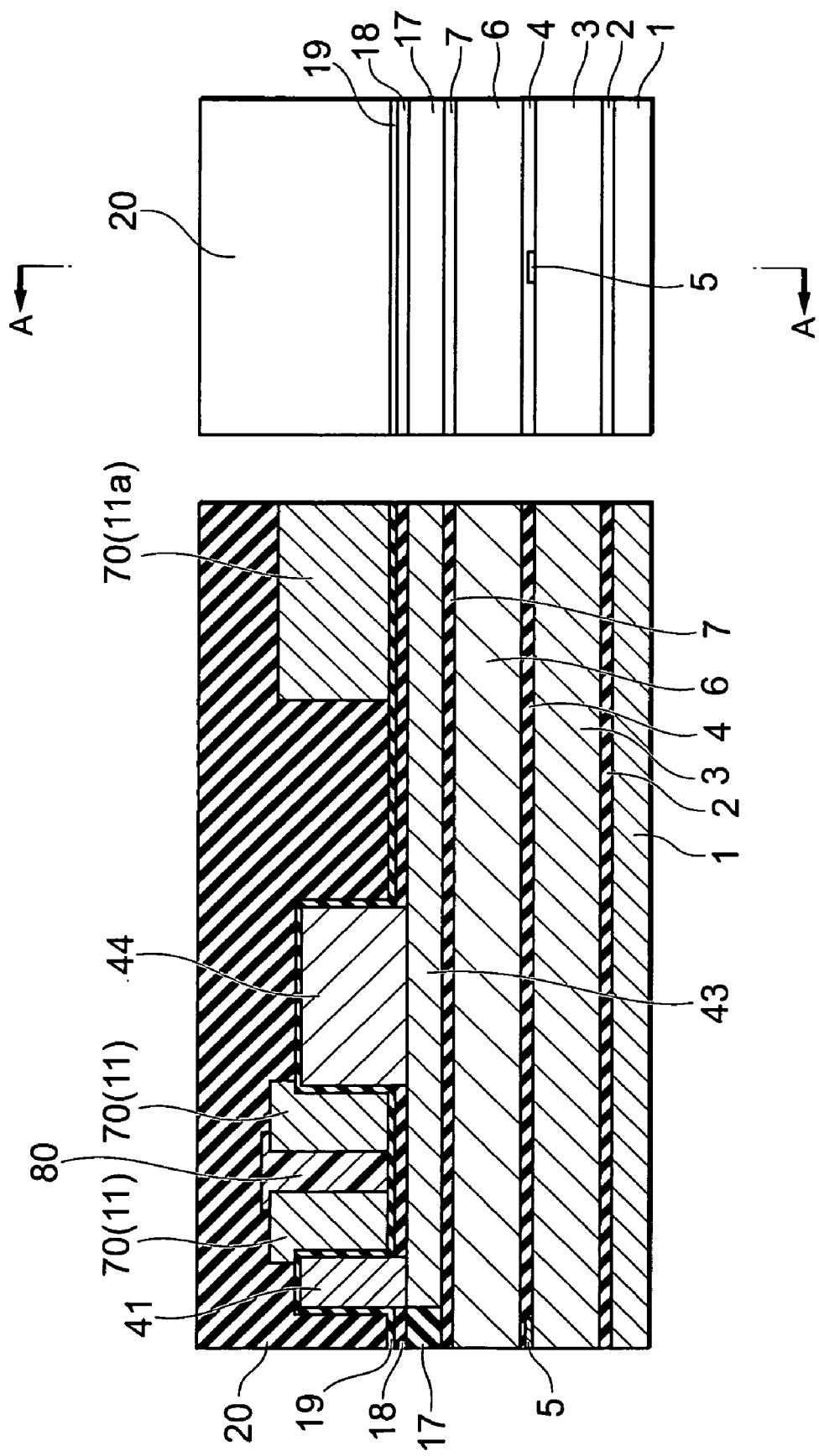

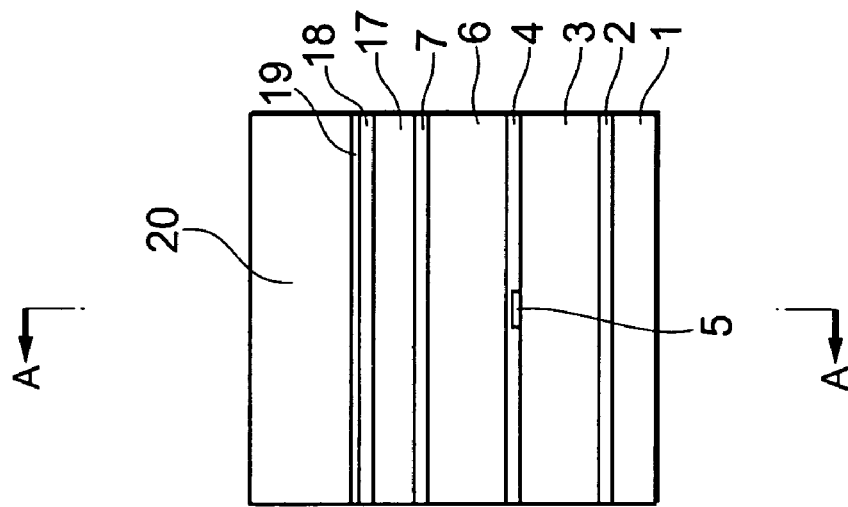
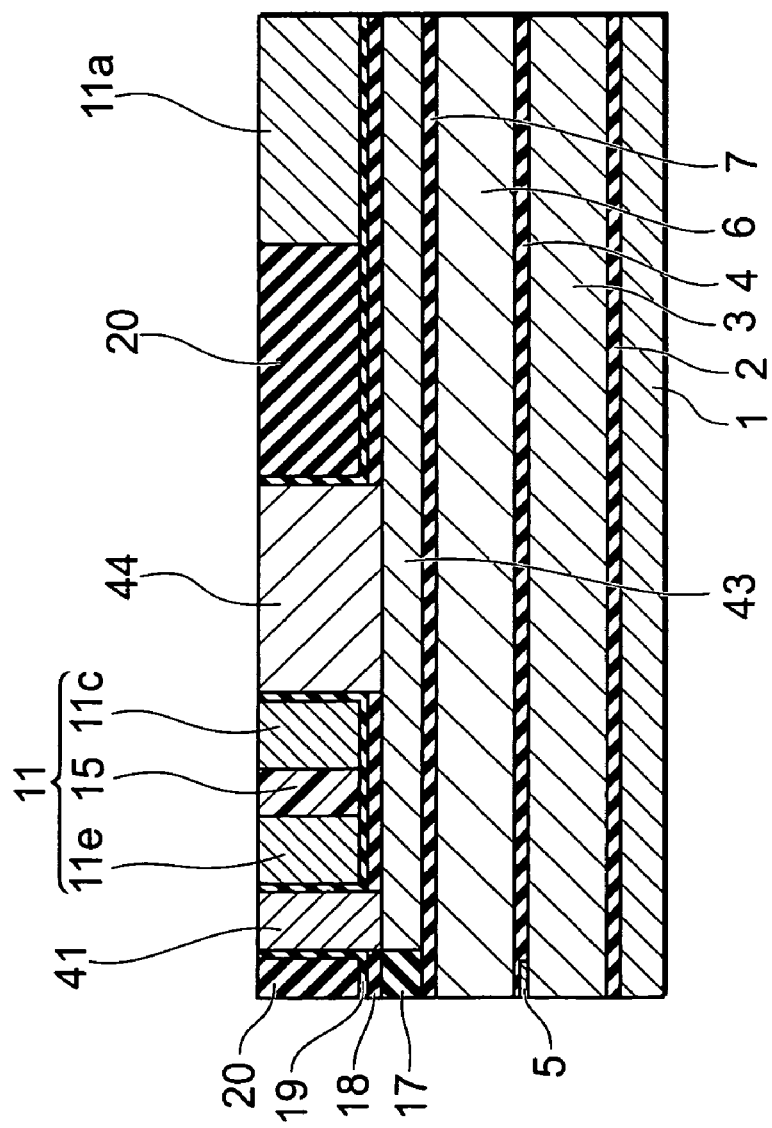

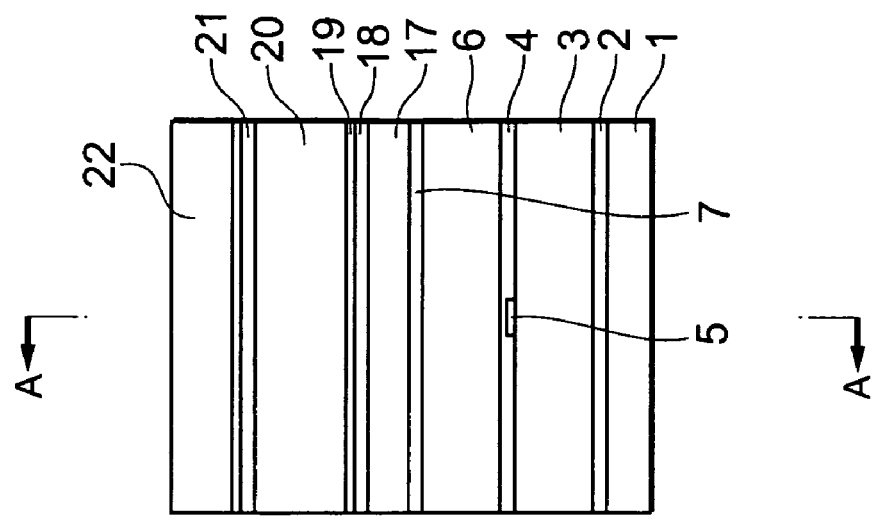
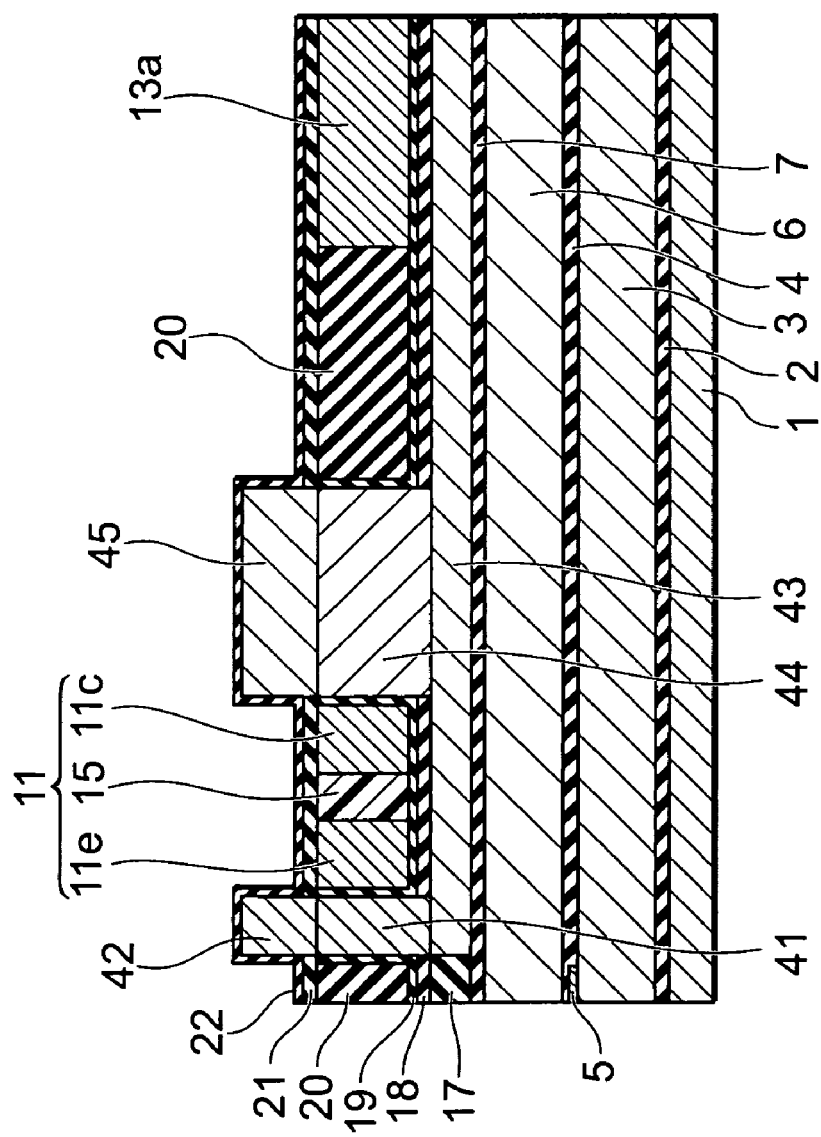

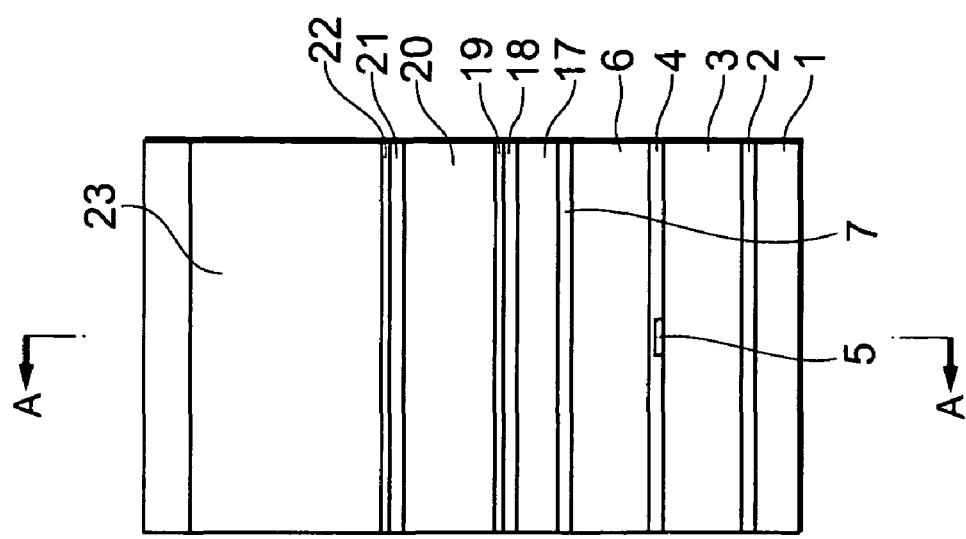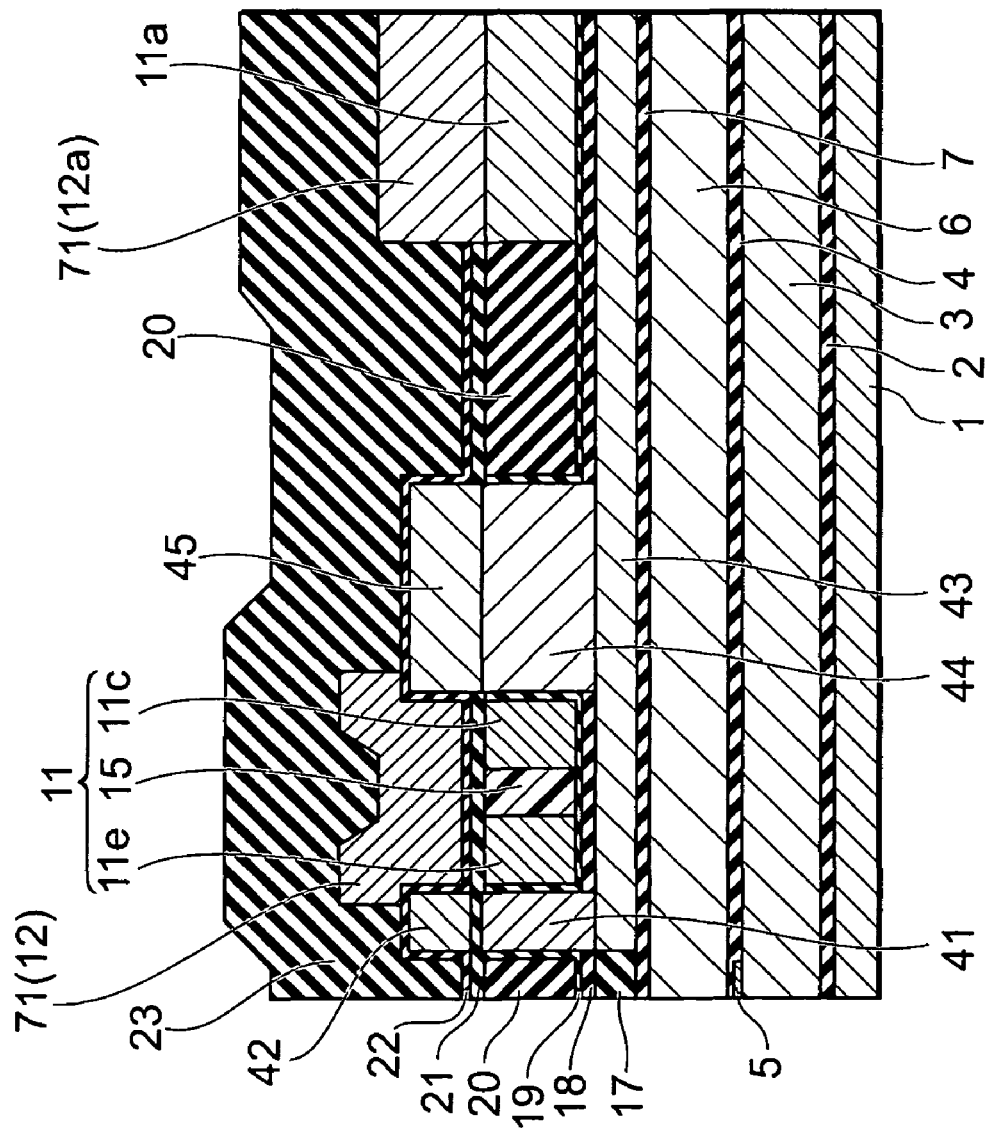

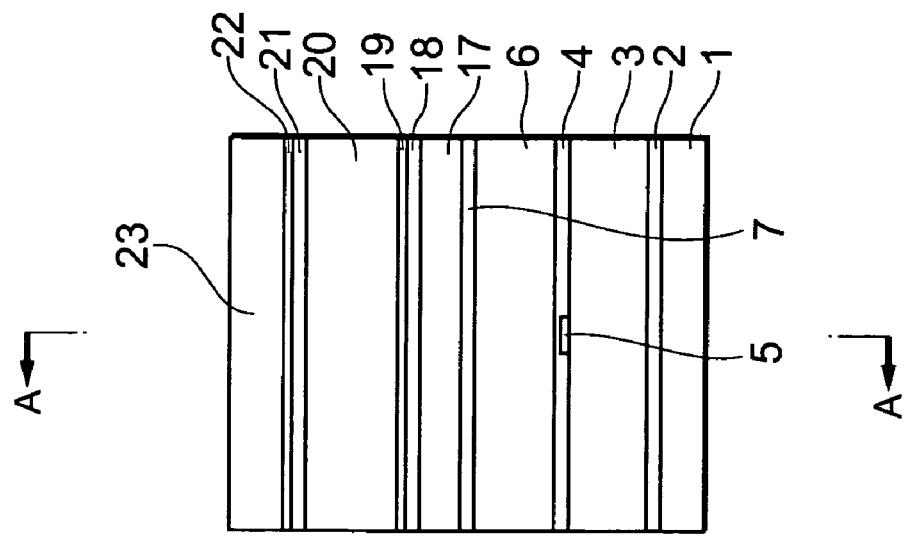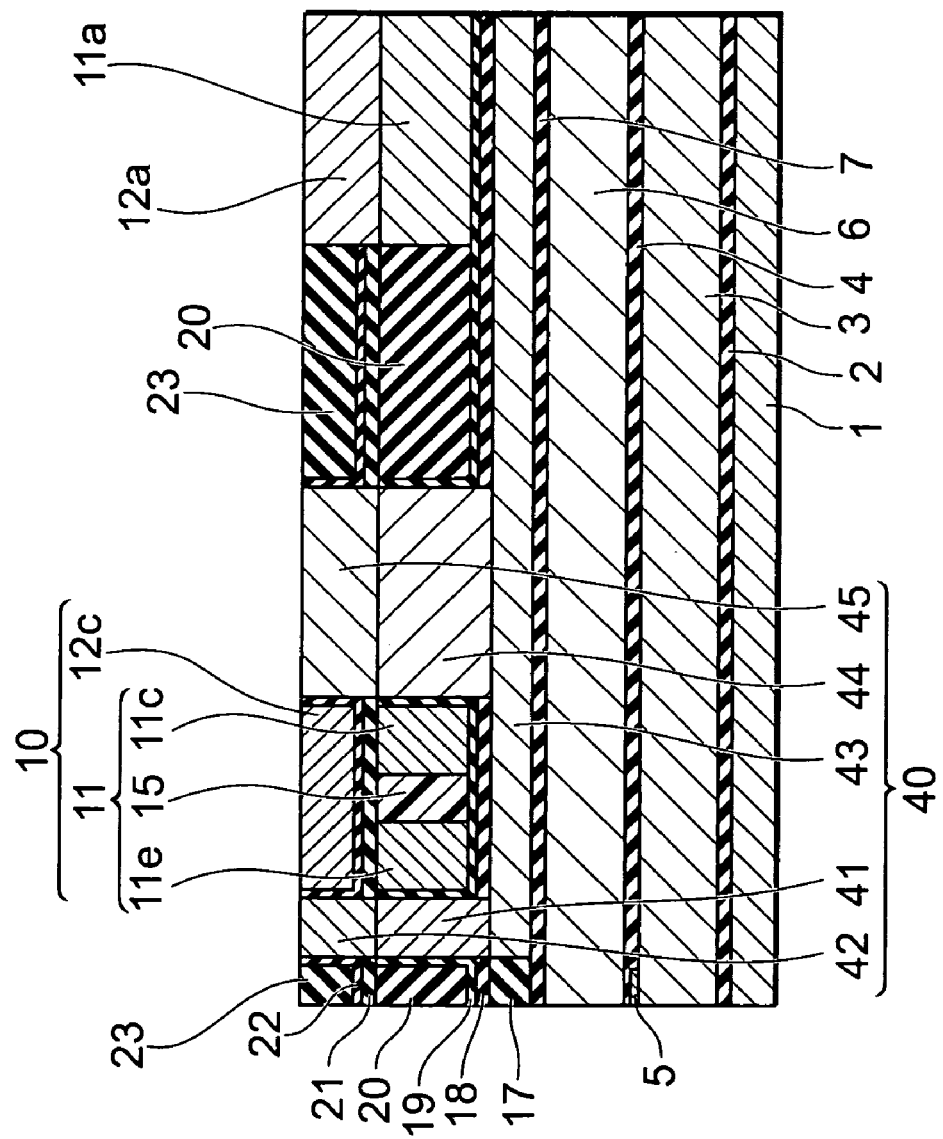

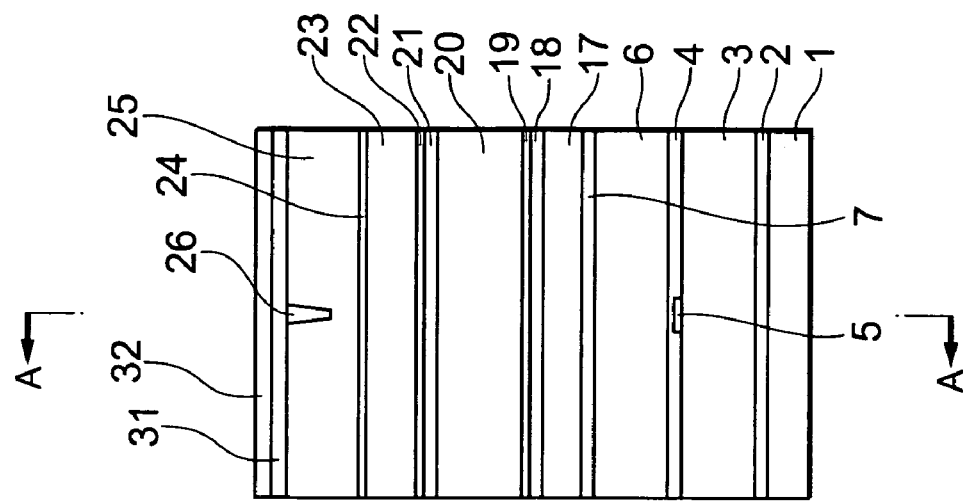
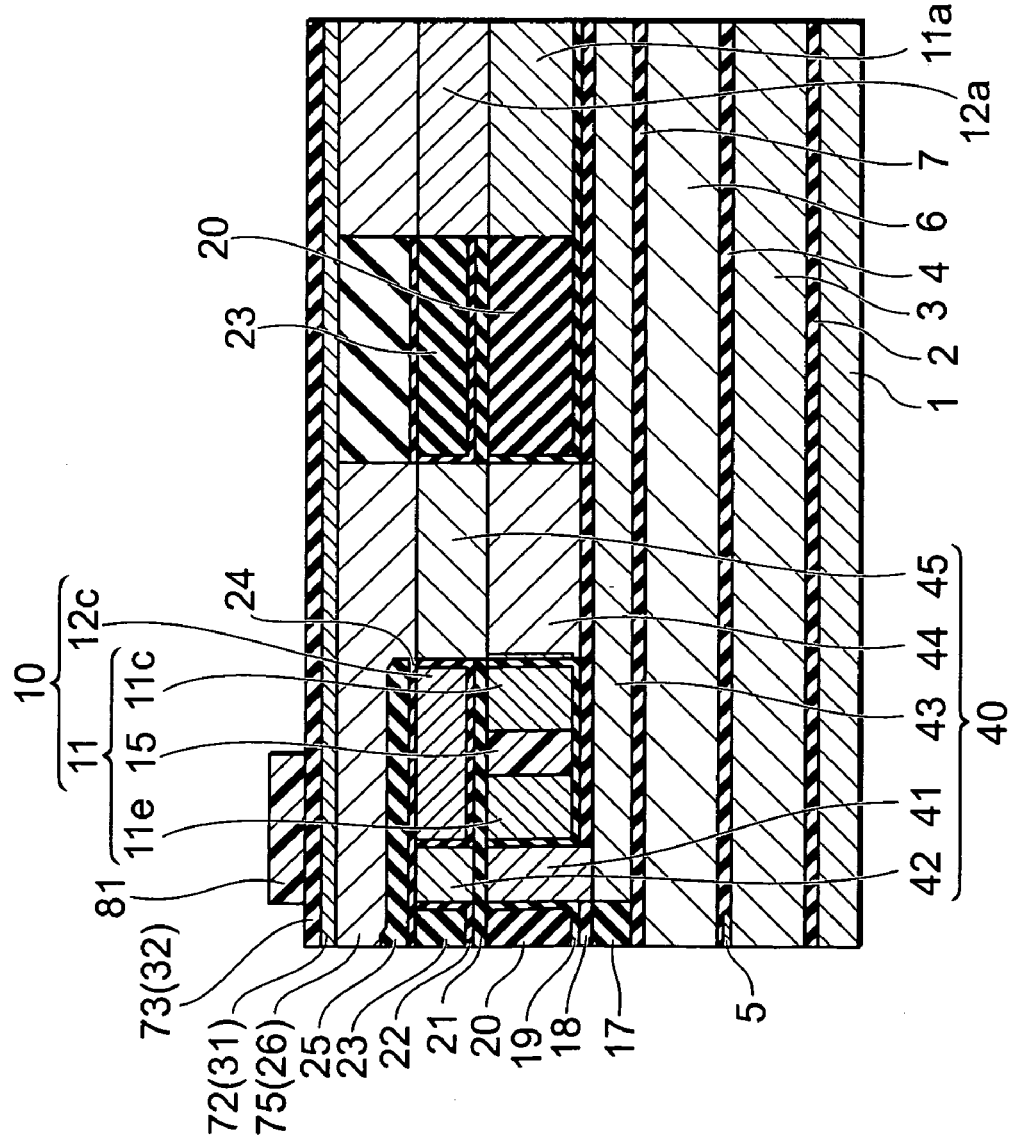

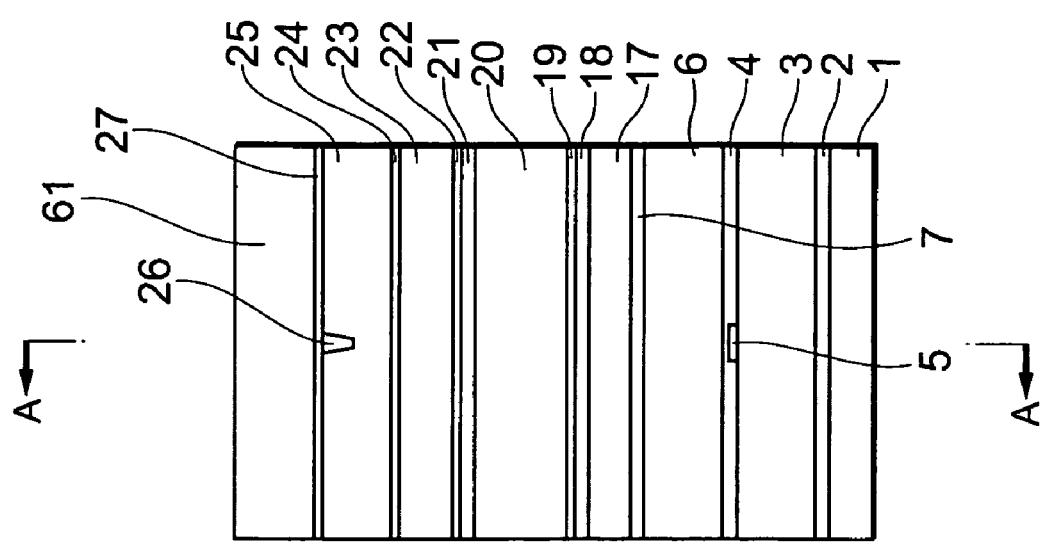
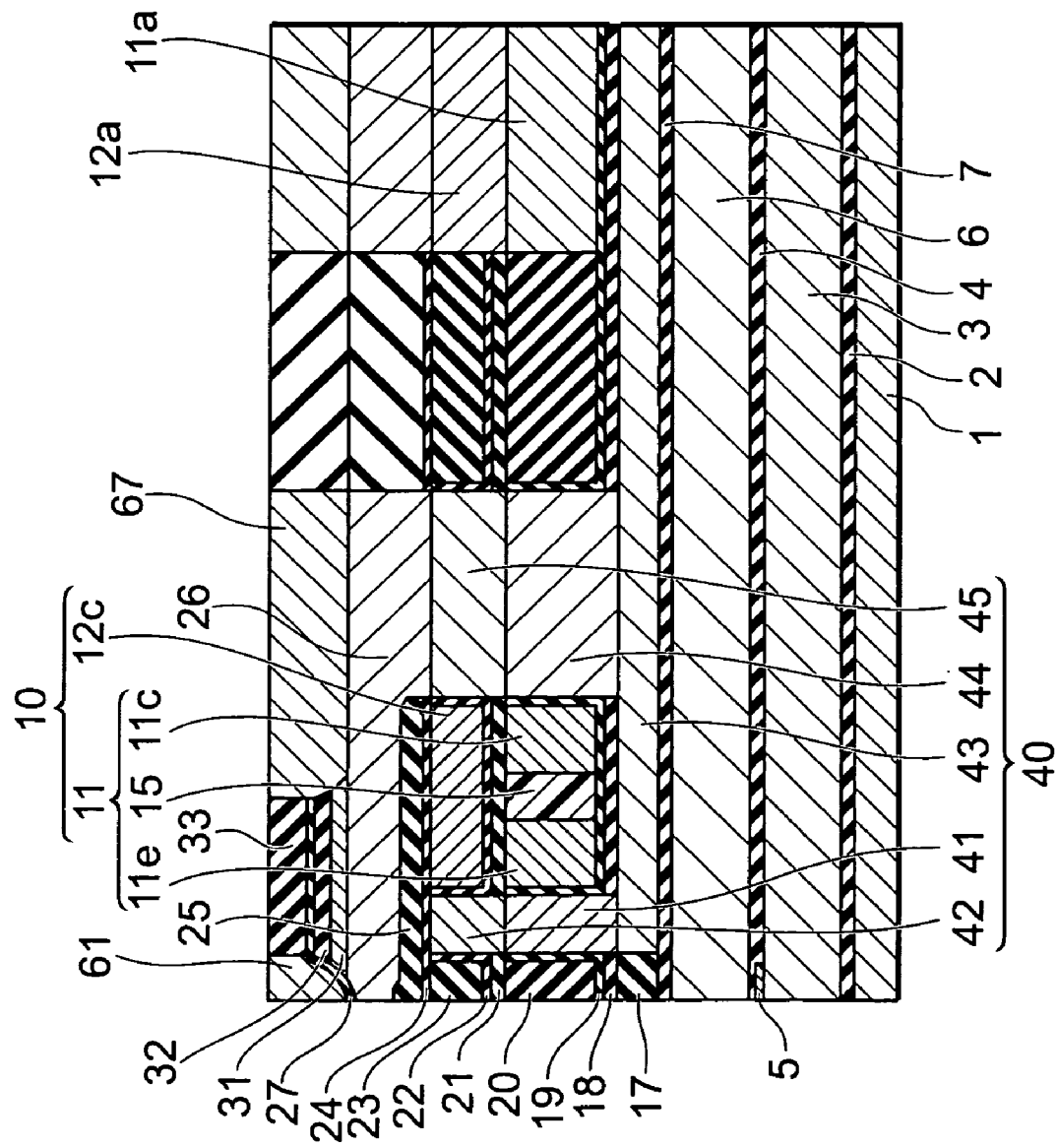

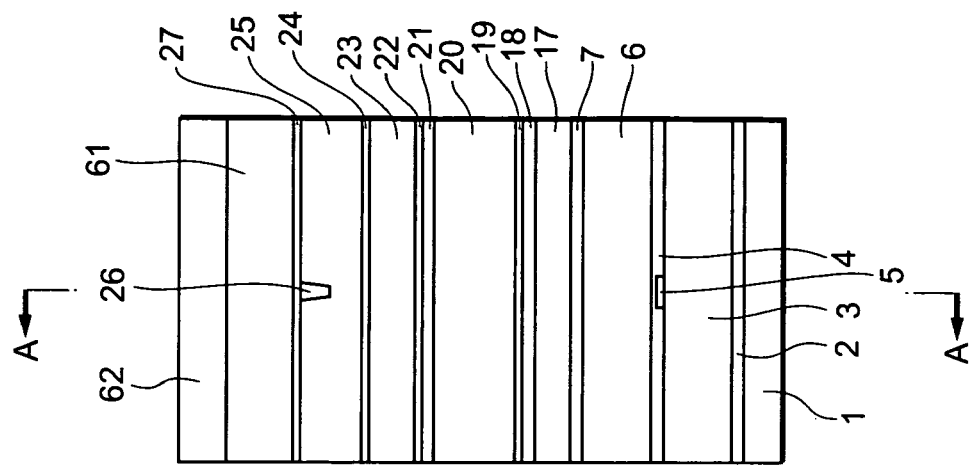
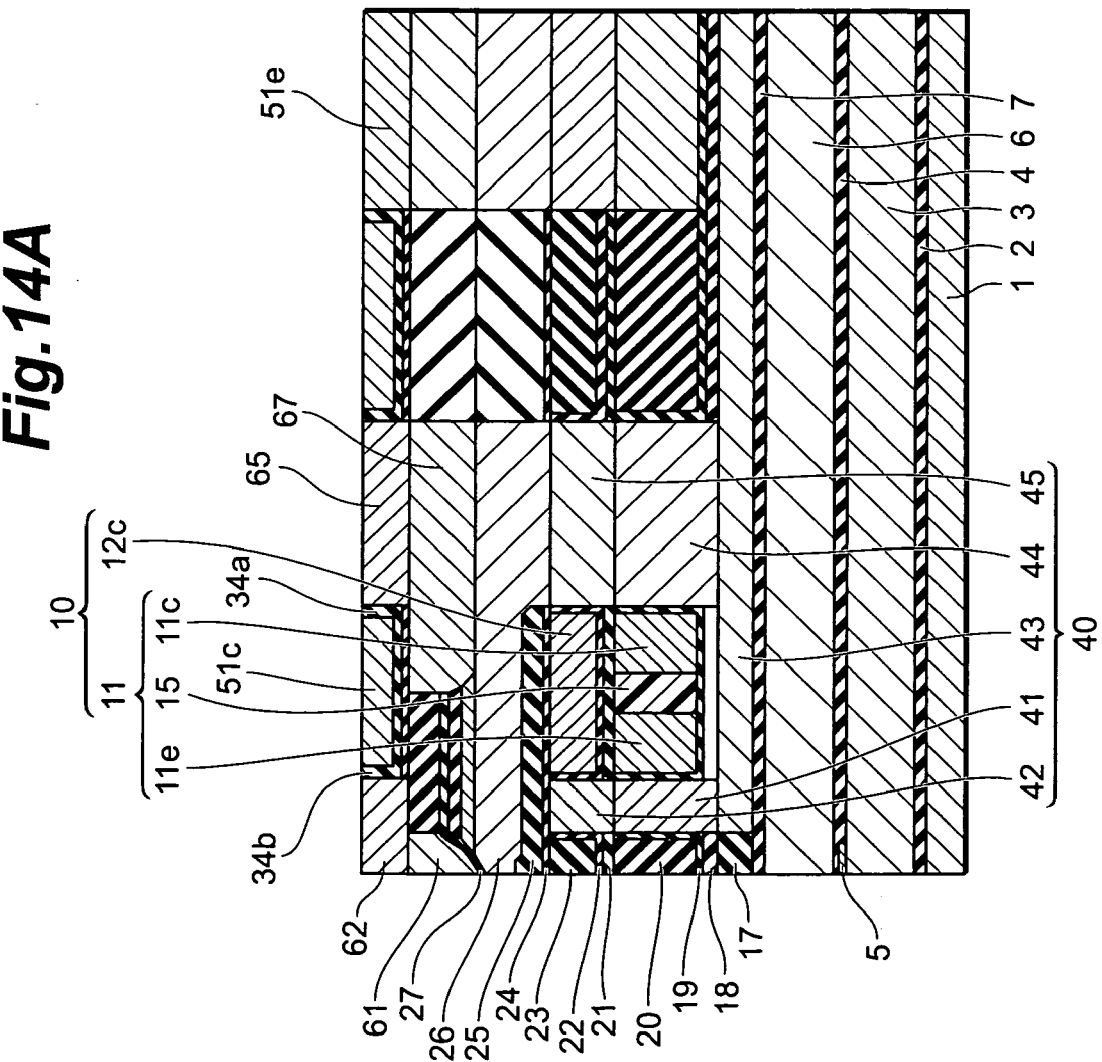

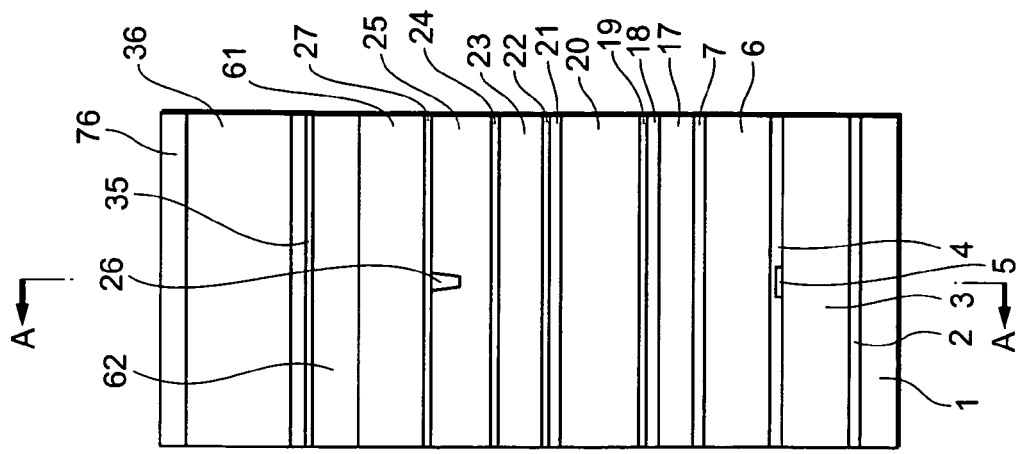
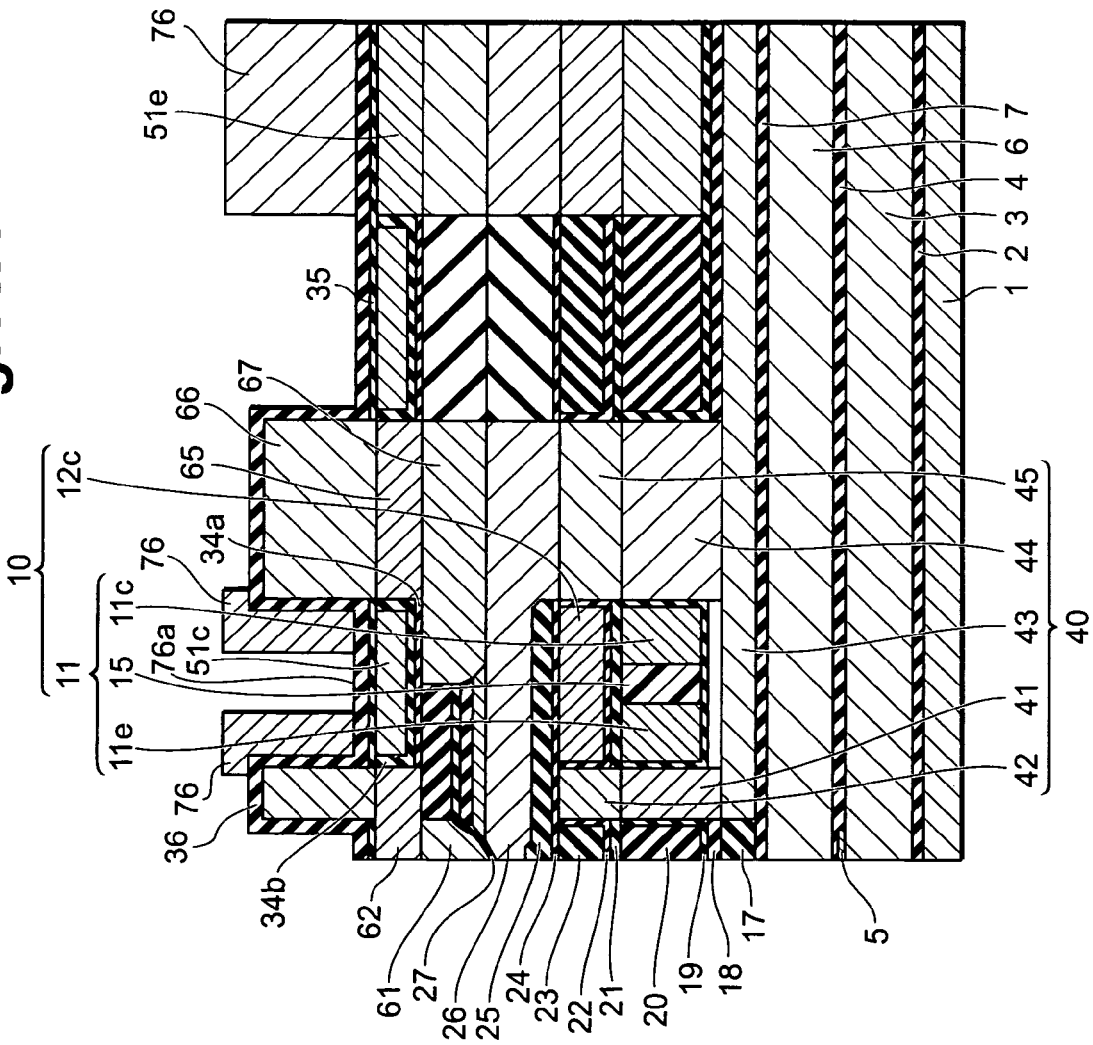

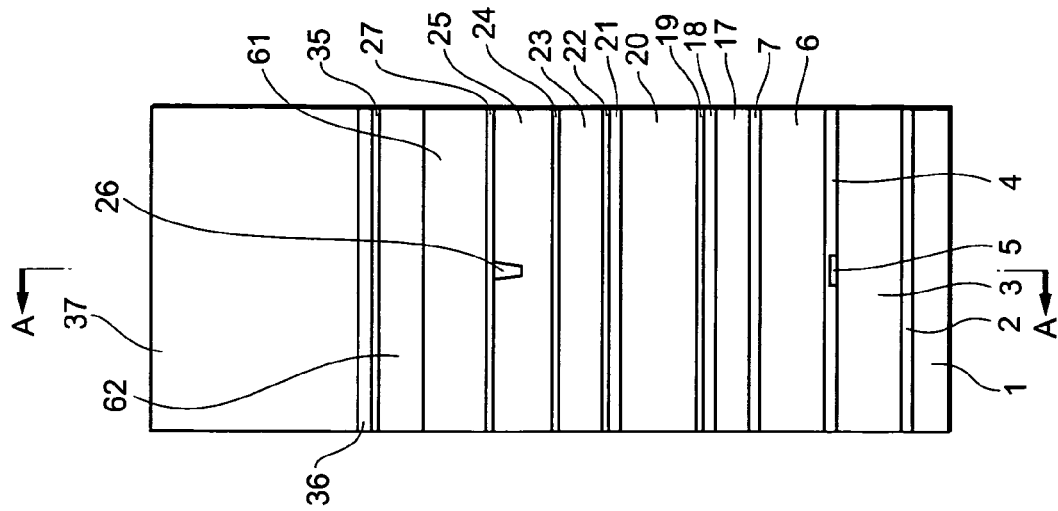
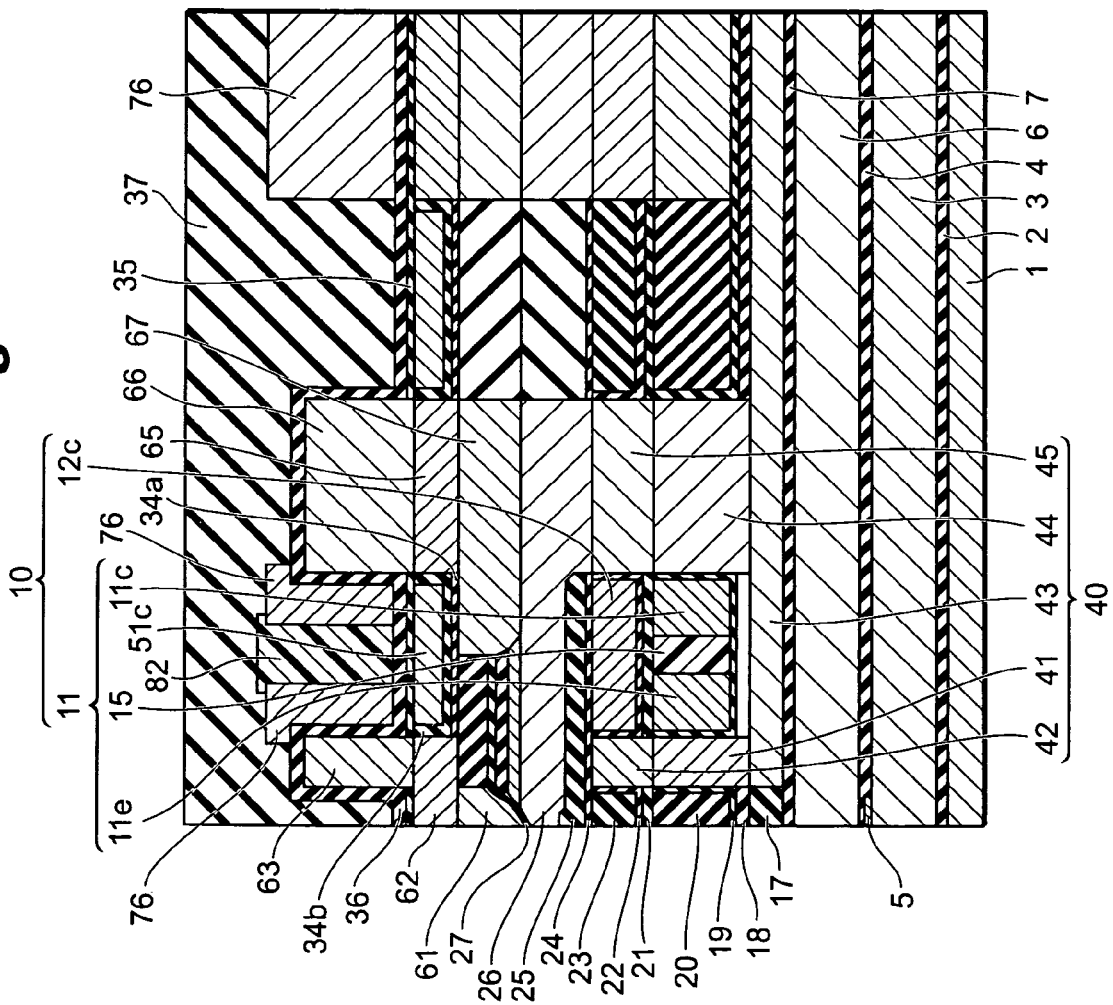

US 8,077,433 B2

THIN-FILM MAGNETIC HEAD, METHOD OF MANUFACTURING THE SAME, HEAD GIMBAL ASSEMBLY, AND HARD DISK DRIVE

BACKGROUND

1. Field of the Invention

The present invention relates to a thin-film magnetic head which performs a magnetic recording action by a perpendicular recording scheme, a method of manufacturing the same, a head gimbal assembly, and a hard disk drive.

2. Related Background Art

In recent years, hard disk drives have remarkably been improving their areal recording density. The areal recording density of hard disks has recently reached and is about to exceed 160 to 200 GB/platter in particular. In keeping with this trend, thin-film magnetic heads have been required to improve their performances.

The thin-film magnetic heads can roughly be classified according to their recording schemes into those of longitudinal magnetic recording type and those of perpendicular magnetic recording type. The longitudinal magnetic recording scheme records data in a (longitudinal) direction within a recording surface of a hard disk (recording medium), while the perpendicular magnetic recording scheme records data such that the direction of recording magnetization formed in the hard disk is made perpendicular to the recording surface. The thin-film magnetic heads of perpendicular magnetic recording type have been considered more promising than those of longitudinal magnetic recording type, since they can realize a much higher recording density than that in the longitudinal magnetic recording scheme, while their recorded hard disks are less susceptible to heat fluctuation.

Conventional thin-film magnetic heads of perpendicular magnetic recording type are disclosed in U.S. Pat. Nos. 6,504,675, 4,656,546, and 4,672,493 and Japanese Patent Application Laid-Open No. 2004-94997, for example.

Meanwhile, a conventional magnetic head of perpendicular magnetic recording type (perpendicular magnetic recording head which will also be referred to as "PMR" in the following) has a magnetic pole layer and a thin-film coil. The magnetic pole layer generates a recording magnetic field for recording data onto a recording medium by the perpendicular magnetic recording scheme. The thin-film coil generates a magnetic field corresponding to the data to be recorded on the recording medium.

A conventional PMR has a connecting part connecting a magnetic pole layer and a write shield layer to each other, for example, while being separated from a medium-opposing surface (also referred to as air bearing surface or ABS). In the case of this PMR, a thin-film coil is wound like a flat spiral about the connecting part.

As this kind of PMR, thin-film magnetic heads 400, 410 shown in FIGS. 27 and 28, respectively, have been known, for example. The thin-film magnetic head 400 has a thin-film coil 404 equipped with four turn parts 403a, 403b, 403c, 403d between an ABS 401 and a write shield layer 402. The thin-film magnetic head 410 has a thin-film coil 414 equipped with three turn parts 413a, 413b, 413c.

SUMMARY OF THE INVENTION

The conventional PMR causes a current to flow through the thin-film coil, so as to generate a magnetic field, thereby recording data onto the recording medium. In the case of the thin-film magnetic heads 400, 410, a current is caused to flow through the thin-film coils 404, 414 so as to record data onto the recording medium.

However, the thin-film coils 404, 414 generate heat when a current flows therethrough. In the case of the thin-film coil 404, for example, a photoresist layer 405 is arranged about the turn parts 403a, 403b, 403c, 403d, whereby the heat generated by the thin-film coil 404 is transmitted to the photoresist layer 405 thereabout. The photoresist layer 405 is formed from an organic material and thus has a coefficient of expansion greater than that of the thin-film coil 404. Therefore, the photoresist layer 405 is easier to expand when heated. When the photoresist layer 405 expands, the end part of the write shield layer on the ABS 401 side is pushed out, whereby the end part of the lower shield layer 406 on the ABS 401 side projects.

For enhancing magnetic fields generated by the thin-film coils 404, 410, it is desirable to increase the number of turn parts (number of turns) as much as possible. For increasing the number of turns while keeping the length (hereinafter referred to as "yoke length") from the medium-opposing surface 401 of the main magnetic pole layer to the write shield layer 402, the widths of the turn parts 403a, 403b, 403c, 403d may be narrowed in the case of the thin-film coil 404. However, this makes it harder for the current to flow through the turn parts 403a, 403b, 403c, 403d, which raises the resistance value in each of the turn parts 403a, 403b, 403c, 403d, thereby increasing the amount of heat generated by the thin-film coil 404.

When the yoke length is made greater, on the other hand, it becomes unnecessary to narrow the widths of the turn parts 403a, 403b, 403c, 403d. This will increase the magnetic path length, however. The magnetic path length is defined by the length of the parts of the main magnetic pole layer and write shield layer holding the thin-film coil therebetween. It has been known to improve the flux rise time, nonlinear transition shift (NLTS) characteristic, overwrite characteristic, and the like of recording heads by making the magnetic path length shorter. These characteristics are harder to improve when the magnetic path length is longer. Therefore, it has been difficult for the conventional PMR to follow rapid changes in recording signals having a high frequency and changing fast.

For overcoming the problems mentioned above, it is an object of the present invention to make it possible to reduce the magnetic path length while securing a necessary number of turns and restrain the write shield layer from projecting in a thin-film magnetic head which performs a magnetic recording action by the perpendicular magnetic recording scheme, a method of manufacturing the same, a head gimbal assembly, and a hard disk drive.

For achieving the above-mentioned object, in one aspect, the present invention provides a thin-film magnetic head constructed such that a main magnetic pole layer having a magnetic pole end face on a side of a medium-opposing surface opposing a recording medium, a write shield layer opposing the main magnetic pole layer on the medium-opposing surface side, a gap layer formed between the main magnetic pole layer and write shield layer, and a thin-film coil wound about the write shield layer or main magnetic pole layer are laminated on a substrate; wherein the thin-film coil has first and second conductor layers including turn parts arranged at a position separated from the medium-opposing surface; and wherein the thin-film magnetic head has an equidistant two-stage structure where a first turn part of the first conductor layer and a second turn part of the second conductor layer overlap vertically along the medium-opposing surface while having the same front distance from respective front side faces closer to the medium-opposing surface to the medium-opposing surface.

Since the thin-film coil has an equidistant two-stage structure in which the first and second turn parts have the same front distance in this thin-film magnetic head, the front side faces of the first and second turn parts closer to the medium-opposing surface align with each other.

Preferably, in the thin-film magnetic head, the first and second turn parts have the same rear side distance from respective rear side faces farther from the medium-opposing surface to the medium-opposing surface.

In this case, the rear side faces of the first and second turn parts farther from the medium-opposing surface also align with each other.

Preferably, the number of the first turn parts differs from the number of the second turn parts in the first and second conductor layers, while one having a smaller number of the turn parts is formed thinner than the other.

In this case, one having a smaller number in the first and second turn parts can be made wider and thus does not inhibit a current from flowing even when made thinner.

The thin-film magnetic head may have upper and lower conductor groups, arranged at respective positions equidistant from the medium-opposing surface, opposing each other while holding the main magnetic pole layer therebetween, wherein each of the upper and lower conductor groups has the first and second conductor layers.

In this case, each of the upper and lower conductor groups has the equidistant two-stage structure, whereby the front side faces of the first and second turn parts closer to the medium-opposing surface align with each other in each of the upper and lower conductor groups.

Preferably, the thin-film magnetic head further comprises an interlayer insulating layer having a uniform thickness arranged between the first and second conductor layers.

This interlayer insulating layer can insulate the first and second conductor layers from each other.

In the thin-film magnetic head, the write shield layer may have first and second front shield parts arranged closer to the medium-opposing surface than is the thin-film coil while overlapping vertically along the medium-opposing surface, and first and second rear shield parts arranged farther from the medium-opposing surface than is the thin-film coil while overlapping vertically along the medium-opposing surface, wherein the first conductor layer is arranged between the first front and rear shield parts, and wherein the second conductor layer is arranged between the second front and rear shield parts.

In this case, the first and second conductor layers are arranged between their corresponding front and rear shield parts.

The thin-film magnetic head may further comprise a first intermediate insulating layer arranged between the first conductor layer and the first front and rear shield parts, and a second intermediate insulating layer arranged between the second conductor layer and the second front and rear shield parts, wherein each of the first and second intermediate insulating layers has a thickness of 0.02 to 0.3 μm.

The first conductor layer may have two first turn parts, while the second conductor layer may have one second turn part, wherein the second conductor layer is formed thinner than the first conductor layer.

The first and second turn parts may be formed two each.

The thin-film magnetic head may further comprise a first opposing insulating layer arranged closer to the medium-opposing surface than is the first front shield part, and a second opposing insulating layer arranged closer to the medium-opposing surface than is the second front shield part. Preferably, in the thin-film magnetic head, the first front shield part, first rear shield part, and first conductor layer have respective surfaces flush with each other, while the second front shield part, second rear shield part, and second conductor layer have respective surfaces flush with each other.

In another aspect, the present invention provides a method of manufacturing a thin-film magnetic head constructed such that a main magnetic pole layer having a magnetic pole end face on a side of a medium-opposing surface opposing a recording medium, a write shield layer opposing the main magnetic pole layer on the medium-opposing surface side, a gap layer formed between the main magnetic pole layer and write shield layer, and a thin-film coil wound about the write shield layer or main magnetic pole layer are laminated on a substrate, the method comprising the following steps (1) and (2):

(1) forming a first conductor layer constituting the thin-film coil on a surface of a multilayer body and then forming an interlayer insulating layer on the first conductor layer; and (2) forming a second conductor layer constituting the thin-film coil on the interlayer insulating layer at a position separated from the medium-opposing surface equidistantly as the first conductor layer.

This manufacturing method can form a thin-film coil having first and second conductor layers overlapping each other at the positions equidistant from the medium-opposing surface.

The manufacturing method may further comprise the steps of forming first front and rear shield parts constituting the write shield layer on the surface of the multilayer body before forming the first conductor layer, and forming an intermediate insulating layer so as to cover the first front and rear shield parts, wherein the first conductor layer is formed between the first front and rear shield parts on the surface of the multilayer body.

This can form the first conductor layer between the first front and rear shield parts on the surface of the multilayer body, and the second conductor layer thereon.

Preferably, the manufacturing method forms an intermittent conductor layer provided with only one interstice between the first front and rear shield parts when forming the first conductor layer between the first front and rear shield parts on the surface of the multilayer body.

This can reliably form the first conductor layer having two turn parts.

The manufacturing method may further comprise the steps of forming an intermittent conductor layer provided with only one interstice between the first front and rear shield parts on the surface of the multilayer body; and forming a photosensitive resin layer at the interstice in the intermittent conductor layer and then forming a cover insulating film adapted to cover the surface of the multilayer body, and thereafter polishing the surface of the multilayer body until the first front and rear shield parts emerge, so as to form the first conductor layer between the first front and rear shield parts.

The manufacturing method may further comprise the steps of forming second front and rear shield parts constituting the write shield layer on the surface of the multilayer body at positions separated from the medium-opposing surface equidistantly as the first front and rear shield parts, respectively, before forming the second conductor layer; and forming an intermediate insulating layer so as to cover the second front and rear shield parts; wherein the second conductor layer is formed between the second front and rear shield parts on the surface of the multilayer body.

The manufacturing method may form a conductor layer between the second front and rear shield parts, then form a cover insulating film adapted to cover the surface of the multilayer body, and thereafter polish the surface of the multilayer body until the second front and rear shield parts emerge, so as to form the second conductor layer between the second front and rear shield parts.

In still another aspect, the present invention provides a head gimbal assembly comprising a thin-film magnetic head formed on a support and a gimbal for securing the support; wherein the thin-film magnetic head is constructed such that a main magnetic pole layer having a magnetic pole end face on a side of a medium-opposing surface opposing a recording medium, a write shield layer opposing the main magnetic pole layer on the medium-opposing surface side, a gap layer formed between the main magnetic pole layer and write shield layer, and a thin-film coil wound about the write shield layer or main magnetic pole layer are laminated on a substrate; wherein the thin-film coil has first and second conductor layers including turn parts arranged at a position separated from the medium-opposing surface; and wherein the thin-film magnetic head has an equidistant two-stage structure where a first turn part of the first conductor layer and a second turn part of the second conductor layer overlap vertically along the medium-opposing surface while having the same front distance from respective front side faces closer to the medium-opposing surface to the medium-opposing surface.

In still another aspect, the present invention provides a hard disk drive comprising a head gimbal assembly having a thin-film magnetic head and a recording medium opposing the thin-film magnetic head; wherein the thin-film magnetic head is constructed such that a main magnetic pole layer having a magnetic pole end face on a side of a medium-opposing surface opposing a recording medium, a write shield layer opposing the main magnetic pole layer on the medium-opposing surface side, a gap layer formed between the main magnetic pole layer and write shield layer, and a thin-film coil wound about the write shield layer or main magnetic pole layer are laminated on a substrate; wherein the thin-film coil has first and second conductor layers including turn parts arranged at a position separated from the medium-opposing surface; and wherein the thin-film magnetic head has an equidistant two-stage structure where a first turn part of the first conductor layer and a second turn part of the second conductor layer overlap vertically along the medium-opposing surface while having the same front distance from respective front side faces closer to the medium-opposing surface to the medium-opposing surface.

The present invention will be more fully understood from the detailed description given hereinbelow and the accompanying drawings which are given by way of illustration only, and thus are not to be considered as limiting the present invention.

BRIEF DESCRIPTION OF THE DRAWINGS

FIG. 1A is a sectional view of the thin-film magnetic head in accordance with a first embodiment of the present invention taken along the line A-A of FIG. 1B, which is a direction intersecting its ABS, while FIG. 1B is a front view showing the ABS of the thin-film magnetic head;

FIG. 2A is a plan view showing the first conductor layer and first rear shield part in a lower thin-film coil, while FIG. 2B is a plan view similarly showing the second conductor layer and second rear shield part;

FIG. 3A is a plan view showing a main part of the first conductor layer in the lower thin-film coil, while FIG. 3B is a plan view similarly showing a main part of the second conductor layer;

FIG. 4A is a plan view showing the second conductor layer and second rear shield part in an upper thin-film coil, while FIG. 4B is a plan view similarly showing the first conductor layer and first rear shield part;

FIGS. 5A and 5B are sectional views corresponding to FIGS. 1A and 1B, respectively, in a step of manufacturing the thin-film magnetic head in accordance with the first embodiment;

FIGS. 6A and 6B are sectional views corresponding to FIGS. 1A and 1B, respectively, showing a step subsequent to that of FIG. 5;

FIGS. 7A and 7B are sectional views corresponding to FIGS. 1A and 1B, respectively, showing a step subsequent to that of FIG. 6;

FIGS. 8A and 8B are sectional views corresponding to FIGS. 1A and 1B, respectively, showing a step subsequent to that of FIG. 7;

FIGS. 9A and 9B are sectional views corresponding to FIGS. 1A and 1B, respectively, showing a step subsequent to that of FIG. 8;

FIGS. 10A and 10B are sectional views corresponding to FIGS. 1A and 1B, respectively, showing a step subsequent to that of FIG. 9;

FIGS. 11A and 11B are sectional views corresponding to FIGS. 1A and 1B, respectively, showing a step subsequent to that of FIG. 10;

FIGS. 12A and 12B are sectional views corresponding to FIGS. 1A and 1B, respectively, showing a step subsequent to that of FIG. 11;

FIGS. 13A and 13B are sectional views corresponding to FIGS. 1A and 1B, respectively, showing a step subsequent to that of FIG. 12;

FIGS. 14A and 14B are sectional views corresponding to FIGS. 1A and 1B, respectively, showing a step subsequent to that of FIG. 13;

FIGS. 16A and 16B are sectional views corresponding to FIGS. 1A and 1B, respectively, showing a step subsequent to that of FIG. 15;

FIGS. 17A and 17B are sectional views corresponding to FIGS. 1A and 1B, respectively, showing a step subsequent to that of FIG. 16;

FIG. 18A is a perspective view showing the structure of the part of a main magnetic pole layer on the ABS side, while

FIG. 20A is a plan view showing a cavity, while

DESCRIPTION OF THE PREFERRED EMBODIMENTS

Figure 15B:
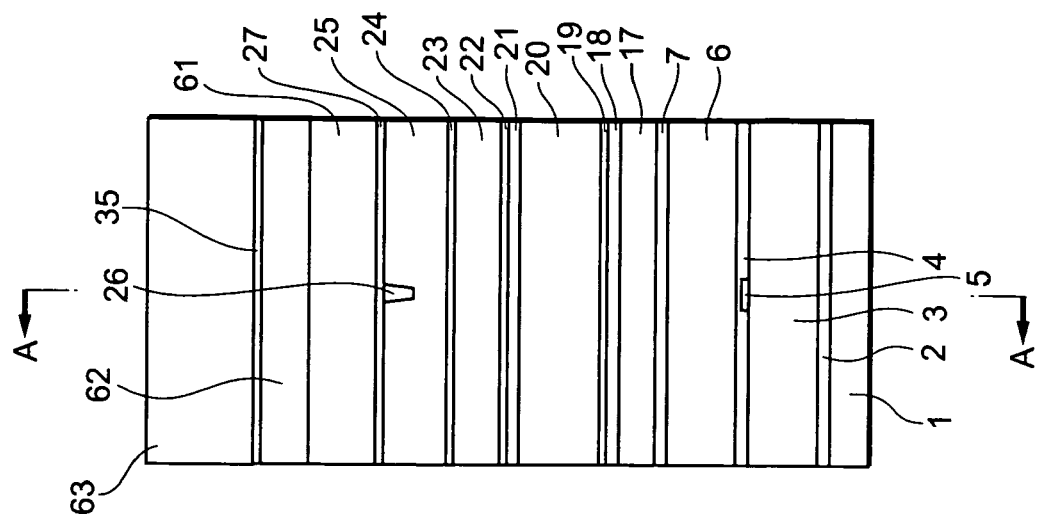
FIGS. 15A and 15B are sectional views corresponding to FIGS. 1A and 1B, respectively, showing a step subsequent to that of FIG. 14.

In the following, embodiments of the present invention will be explained with reference to the drawings. The same constituents will be referred to with the same numerals or letters, while omitting their overlapping explanations.

First Embodiment

Structure of Thin-Film Magnetic Head

To begin with, the structure of a thin-film magnetic head of perpendicular magnetic recording type in accordance with the first embodiment of the present invention will be explained with reference to FIGS. 1A and 1B to 4A and 4B. Here, FIG. 1A is a sectional view of the thin-film magnetic head 300 in accordance with the first embodiment of the present invention taken along the line A-A of FIG. 1B, which is a direction intersecting its air bearing surface (which will hereinafter be referred to as ABS), while FIG. 1B is a front view showing the ABS 30 of the thin-film magnetic head 300. FIG. 2A is a plan view showing a first conductor layer 11 and a first rear shield part 44, while FIG. 2B is a plan view showing a second conductor layer 12 and a second rear shield part 45. FIG. 3A is a plan view showing a main part of the first conductor layer 11, while FIG. 3B is a plan view showing a main part of the second conductor layer 12. FIG. 4A is a plan view showing a second conductor layer 52 and a second rear shield part 66, while FIG. 4B is a plan view showing a first conductor layer 51 and a first rear shield part 65.

The thin-film magnetic head 300 comprises a substrate 1 and reproducing and recording heads laminated on the substrate 1, while having the ABS 30 as a medium-opposing surface opposing a recording medium. The following will explain structures of main parts of the thin-film magnetic head 300, while structures of parts other than the main parts will later be explained in manufacturing steps.

The reproducing head has an MR device 5, arranged near the ABS 30, for detecting a magnetic signal. The reproducing head has an insulating layer 2 formed on the substrate 1, a lower shield layer 3 made of a magnetic material, and a shield gap film 4 shielding the MR device 5. The reproducing head further has an upper shield layer 6 made of a magnetic material formed on the shield gap film 4, and an insulating layer 7 formed on the upper shield layer 6.

The MR device 5 is constituted by a magnetosensitive film exhibiting a magnetoresistive effect, such as AMR (anisotropic magnetoresistive), GMR (giant magnetoresistive), and TMR (tunneling magnetoresistive) devices.

The recording head has a lower thin-film coil 10, a main magnetic pole layer 26, a gap layer 27, a lower shield layer 40, an upper thin-film coil 50, and an upper shield layer 60, which are laminated on the substrate 1.

The recording head also has a first lower opposing insulating layer 20 arranged (at a position) closer to the ABS 30 than is the lower thin-film coil 10, a second lower opposing insulating layer 23, and an upper opposing insulating layer 37 arranged closer to the ABS 30 than is the upper thin-film coil 50.

The recording head further has a lower interlayer insulating layer 21, an upper interlayer insulating layer 35, a first lower intermediate insulating layer 19, a second lower intermediate insulating layer 22, a first upper intermediate insulating layer 34b, and a second upper intermediate insulating layer 36.

The lower thin-film coil 10 has the first conductor layer 11 and second conductor layer 12 arranged at positions separated from the ABS 30, while a lower conductor group is constituted by the first and second conductor layers 11, 12. The first and second conductor layers 11, 12 are arranged parallel to each other in a direction along the ABS 30 (which will be referred to as "vertical direction" in this embodiment).

In the lower thin-film coil 10, the second conductor layer 12 overlies the first conductor layer 11 while interposing the lower interlayer insulating layer 21 therebetween. The lower thin-film coil 10 has an equidistant two-stage structure in which the first and second conductor layers 11, 12 have the same front distance and the same rear distance.

Here, the front distance of the first conductor layer 11 is the distance from a front side face 11ef (see FIG. 3A) of a turn part 11a closer to the ABS 30, which will be explained later, to the ABS 30. The front distance of the second conductor layer 12 is the distance from a front side face 12cf (see FIG. 3B) of a turn part 12c closer to the ABS 30 to the ABS 30. Each of the front distances of the first and second conductor layers 11, 12, which is the sum of t1 shown in FIG. 1 and the thickness of the first lower intermediate insulating layer 19, is about 1.5 μm.

The rear distance of the first conductor layer 11 is the distance from a rear side face 11cr (see FIG. 3A) of the turn part 11c farther from the ABS 30, which will be explained later, to the ABS 30. The rear distance of the second conductor layer 12 is the distance from a rear side face 12cr (see FIG. 3B) of the turn part 12c farther from the ABS 30 to the ABS 30. Each of the rear distances of the first and second conductor layers 11, 12, which is the length obtained when the thickness of the lower intermediate insulating layer 19 is subtracted from t2 shown in FIG. 1, is about 3.7 μm.

On the other hand, t1 shown in FIG. 1 refers to the distance from the ABS 30 to the part of the first intermediate insulating layer 19 on the turn part 11e side and is about 1.4 μm, while t2 refers to the distance (yoke length) from the ABS 30 to the part of the first lower intermediate insulating layer 19 on the turn part 11c side and is about 3.8 μm.

The thickness of the first conductor layer 11 is about 1.1 μm, while the thickness of the second conductor layer 12 is about 0.7 μm. Thus, the second conductor layer 12 is formed thinner than the first conductor layer 11.

As also shown in FIG. 2A, the first conductor layer 11 has two turn parts 11c, 11e arranged between first front and rear shield parts 41, 44 which will be explained later. The turn parts 11c, 11e align with each other while interposing a photoresist layer 15 therebetween. The first conductor layer 11 has a half-loop part 11b extending from a connecting part 11a connected to the second conductor layer 12 to the turn part 11c, a one-loop part 11d extending from the turn part 11c to the turn part 11e, and a half-loop part 11f extending from the turn part 11e to a lead part 13.

The first conductor layer 11 is constructed as a continuous line from the connecting part 11a to the half-loop part 11f, so as to be wound as a flat spiral about the lower shield layer 40, thus forming a 2-turn loop as a whole. For convenience of illustration, FIG. 1A shows only the connecting part 11a and turn parts 11c, 11e in the first conductor layer 11. FIGS. 3A and 3B do not depict the insulating layers. Each of the turn parts 11c, 11e has a vertically long structure in which the height is greater than the width.

In the first conductor layer 11, as shown in FIG. 3A, the one-loop part 11d has a variable width structure in which the width gradually decreases toward the ABS 30 and becomes the smallest at the position closest to the ABS 30. Namely, when widths We1, We2, We0 are defined in the one-loop part 11d as shown in FIG. 3A, We1>We2>We0. The narrowest part in the one-loop part 11d is the turn part 11e. The half-loop part 11b has a variable width structure similar to that of the one-loop part 11d, while the narrowest part is the turn part 11c. Here, the respective widths of the turn parts 11e, 11c are We0 (about 0.9 μm) and Wc0 (about 0.9 μm). The width W11 of the part incorporating the turn parts 11e, 11c, photoresist layer 15, and first lower intermediate insulating layer 19 is about 2.4 μm, while the magnetic path length LM is about 3.2 μm. The half-loop part 11f also has a variable width structure similar to that of the one-loop part 11d.

As also shown in FIG. 2B, the second conductor layer 12 has one turn part 12c arranged between second front and rear shield parts 42, 45. The second conductor layer 12 has a half-loop part 12b extending from a connecting part 12a connected to the first conductor layer 11 to the turn part 12c and a half-loop part 12d extending from the turn part 12c to the connecting part 12e. The second conductor layer 12 is constructed as a continuous line from the connecting part 12a to the half-loop part 12d, so as to be wound as a flat spiral about the lower shield layer 40, thus forming a 1-turn loop as a whole. The half-loop part 12d has a variable width structure similar to that of the one-loop part 11d, while the narrowest part is the turn part 12c. The width W12 of the part incorporating the turn part 12c and second lower intermediate insulating layer 22 is about 2.4 μm. The turn part 12c has a horizontally long structure in which the width is greater than the height.

The first and second conductor layers 11, 12 connect with each other as follows, whereby the lower thin-film coil 10 forms a continuous 3-turn loop. Namely, the lead part 13 is connected to the connecting part 11a through the half-loop part 11f, turn part 11e, one-loop part 11d, turn part 11c, and half-loop part 11b, while the connecting part 11a is connected to the connecting part 12a. The connecting part 12a is further connected to the connecting part 12e through the half-loop part 12b, turn part 12c, and half loop part 12d, whereby the 3-turn loop is formed.

Namely, the lower thin-film coil 10 has a (2+1) turn structure in which the first conductor layer 11 forms a 2-turn loop, and the second conductor layer 12 positioned directly thereabove forms a 1-turn loop, thereby yielding a 3-turn loop. The (A+B) turn structure in this embodiment refers to a structure in which a conductor layer having "B" turns overlies a conductor layer having "A" turns.

The upper thin-film coil 50 has the first conductor layer 51 and second conductor layer 52 arranged at positions separated from the ABS 30, while an upper conductor group is constituted by the first and second conductor layers 51, 52. The first and second conductor layers 51, 52 are arranged in the vertical direction.

In the upper thin-film coil 50, the second conductor layer 52 overlies the first conductor layer 51 while interposing the upper interlayer insulating layer 35 therebetween. The upper thin-film coil 50 has an equidistant two-stage structure in which the first and second conductor layers 51, 52 have the same front distance and the same rear distance. The front distance of the first and second conductor layers 51, 52 equals the front distance of the first conductor layer 11 mentioned above, while the rear distance of the first and second conductor layers 51, 52 equals the rear distance of the first conductor layer 11.

The first conductor layer 51 has a thickness of about 0.7 μm, while the second conductor layer 52 has a thickness of about 1.1 μm. Thus, the first conductor layer 51 is formed thinner than the second conductor layer 52.

As also shown in FIG. 4B, the first conductor layer 51 has one turn part 51c arranged between first front and rear shield parts 62, 65 which will be explained later. The first conductor layer 51 has a half-loop part 51b extending from a connecting part 51a connected to the second conductor layer 52 to the turn part 51c, and a one-loop part 51d extending from the turn part 51c to a connecting part 51e. The first conductor layer 51 is constructed as a continuous line from the connecting part 51a to the half-loop part 51d, so as to be wound as a flat spiral about the upper shield layer 60, thus forming a 1-turn loop as a whole. The half-loop part 51b has a variable width structure similar to that of the one-loop part 11d, while the narrowest part is the turn part 51c.

As also shown in FIG. 4A, the second conductor layer 52 has two turn parts 52c, 52e arranged between second front and rear shield parts 63, 66 which will be explained later. The turn parts 52c, 52e align with each other, while interposing a photoresist layer 55 therebetween. The second conductor layer 52 has a half-loop part 52b extending from a connecting part 52a connected to the first conductor layer 51 to the turn part 52c, a one-loop part 52d extending from the turn part 52c to the turn part 52e, a half loop part 52f extending from the turn part 52e to a connecting part 52g, and the connecting part 52g connected to the outside.

The second conductor layer 52 is constructed as a continuous line from the connecting part 52a to the connecting part 52g, so as to be wound as a flat spiral about the upper shield layer 60, thus forming a 2-turn loop as a whole. For convenience of illustration, FIG. 1A shows only the connecting part 51a, turn part 51c, connecting part 52g, and turn parts 52c, 52e in the first and second conductor layers 51, 52. Each of the half-loop part 52b, one-loop part 52d, and half-loop part 52f has a variable width structure similar to that of the one-loop part 11d. The narrowest part in the one-loop part 52b is the turn part 52c, while the narrowest part in the one-loop part 52d is the turn part 52e.

The first and second conductor layers 51, 52 connect with each other as follows, whereby the upper thin-film coil 50 forms a continuous 3-turn loop. Namely, the connecting part 51a is connected to the connecting part 51e through the half-loop part 51b, turn part 51c, and half-loop part 51d, while the connecting part 51e is connected to the connecting part 52a. The connecting part 52a is further connected to the connecting part 52g through the half-loop part 52b, turn part 52c, one-loop part 52d, turn part 52e, and half loop part 52f, whereby the 3-turn loop is formed.

Namely, the upper thin-film coil 50 has a (1+2) turn structure in which the first conductor layer 51 forms a 1-turn loop, and the second conductor layer 52 positioned directly thereabove forms a 2-turn loop, thereby yielding a 3-turn loop.

Thus constructed lower thin-film coil 10 and upper thin-film coil 50 form a series of coils, and generate a magnetic field corresponding to data to be recorded on a recording medium in response to a current flowing therethrough.

Figure 18A:
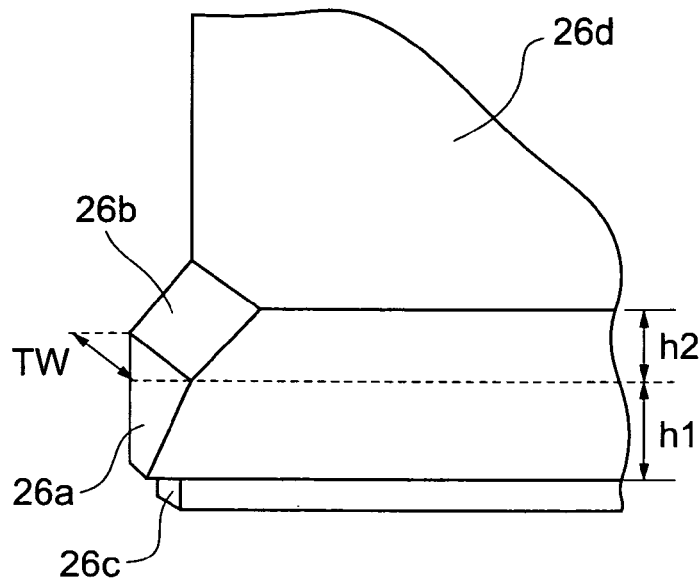
Figure 18B:
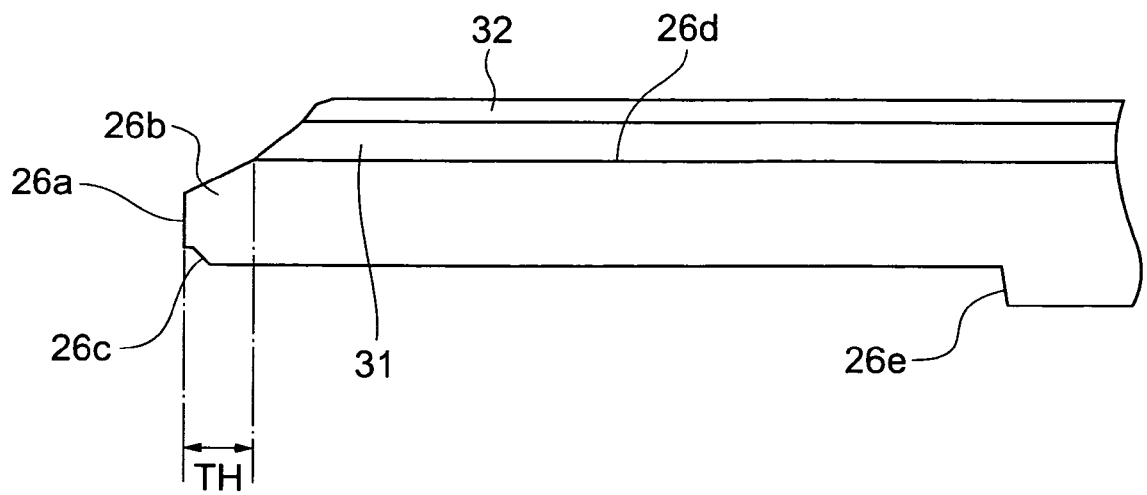
FIG. 18B is a sectional view showing the main magnetic pole layer and a nonmagnetic layer.

As shown in FIGS. 1B, 18A, and 18B, the main magnetic pole layer 26 has a magnetic pole end face 26a on the ABS 30 side. The magnetic pole end face 26a has a bevel form which is wider on the upper thin-film coil 50 side than on the lower thin-film coil 10 side and gradually decreases its width toward the lower thin-film coil 10. The width of the magnetic pole end face 26a on the upper thin-film coil 50 side defines the track width tw. The track width tw is about 0.06 to 0.12 µm, for example.

The main magnetic pole layer 26 includes a track width determining part having the magnetic pole end face 26a, and a wider part which is arranged at a position distanced more from the ABS 30 than is the track width determining part and has a width greater than that of the track width determining part. The track width determining part has a fixed width regardless of the distance from the ABS 30. The wider part has the same width as that of the track width determining part at the boundary with the track width determining part, gradually increases the width as it is distanced more from the ABS 30, and then attains a fixed width. In this embodiment, a part extending from the magnetic pole end part 26a until the width begins to increase is defined as the track width determining part.

The track width determining part in the main magnetic pole layer 26 is formed with a tilted surface 26b and a cutout 26c. The tilted surface 26 is formed as an upslope whose distance from the ABS 30 gradually increases as it is farther from the ABS 30. The cutout 26c is formed on the lower face side (lower thin-film coil 10 side) of the main magnetic pole layer 26.

The wider part in the main magnetic pole layer 26 is formed with an upper end face 26d and a slope 26e. The upper face 26d is formed flat along a direction perpendicular to the ABS 30 at a position distanced more from the ABS 30 than is the tilted surface 26b. The slope 26e is formed on the lower face side (lower thin-film coil 10 side) of the main magnetic pole layer 26.

Nonmagnetic layers 31, 32 are laminated on the upper end face 26d of the main magnetic pole layer 26 between an opposing shield part 61 and an upper yoke part 67, which will be explained later.

The main magnetic pole layer 26 transmits therethrough a magnetic flux corresponding to a magnetic field generated by the lower and upper thin-film coils 10, 50, and generates a recording magnetic field for recording data onto a recording medium by the perpendicular magnetic recording scheme.

The length of the track width determining part from the ABS 30 is referred to as neck height. The neck height is about 0.05 to 0.3 µm, for example. The height h1 from the bottom face of the main magnetic pole layer 26 to the lower end part of the tilted surface 26b is about 0.13 to 0.2 µm, while the height h2 from the lower end part of the tilted surface 26b to the upper end face 26d is about 0.05 to 0.2 µm.

The distance between the edge part located closest to the ABS 30 in the lower face of the nonmagnetic layer 31, which will be explained later, and the ABS 30 equals a throat height TH. The throat height TH is about 0.08 to 0.12 µm, for example.

The gap layer 27 is formed along the tilted surface 26b of the main magnetic pole layer 26 between the opposing shield part 61 and insulating layer 33 and between the main magnetic pole layer 26 and nonmagnetic layers 31, 32. The gap layer 27 is made of an insulating material such as alumina ($Al_2O_3$), and formed so as to cover the tilted surface 26b and nonmagnetic layers 31, 32.

The lower shield layer 40 has a first front shield part 41, a second front shield part 42, a connecting shield part 43, a first rear shield part 44, and a second rear shield part 45.

The first and second front shield parts 41, 42 are arranged closer to the ABS 30 than are the first and second conductor layers 11, 12, respectively. The second front shield part 42 overlies the first front shield part 41, so that the first and second front shield parts 41, 42 form a two-stage structure in which their respective rear side faces farther from the ABS 30 are equidistant from the ABS 30. The connecting shield part 43 is formed such as to straddle the lower thin-film coil 10, thereby connecting the first front and rear shield parts 41, 44 to each other.

The first and second rear shield parts 44, 45 are arranged farther from the ABS 30 than are the first and second conductor layers 11, 12, respectively. The second rear shield part 45 overlies the first rear shield part 44, so that the first and second rear shield parts 44, 45 form a two-stage structure in which their respective front side faces closer to the ABS 30 are equidistant from the ABS 30. The respective surfaces of the first front and rear shield parts 41, 44 and first conductor layer 11 are flush with each other, while the respective surfaces of the second front and rear shield parts 42, 45 and second conductor layer 12 are flush with each other.

The upper shield layer 60 has an opposing shield part 61, a first front shield part 62, a second front shield part 63, a connecting shield part 64, a first rear shield part 65, a second rear shield part 66, and the upper yoke part 67.

The opposing shield part 61 has an end face exposed at the ABS 30, and is formed such as to oppose the main magnetic pole layer 26, nonmagnetic layer 31, and nonmagnetic layer 32 successively from the ABS 30 side through the gap layer 27. The opposing shield part 61 has a flat upper face, to which the first front shield part 62 is connected.

The first and second front shield parts 62, 63 are arranged closer to the ABS 30 than are the first and second conductor layers 51, 52, respectively. The second front shield part 63 overlies the first front shield part 62, so that the first and second front shield parts 62, 63 form a two-stage structure in which their respective rear side faces farther from the ABS 30 are equidistant from the ABS 30. The connecting shield part 64 is formed such as to straddle the upper thin-film coil 50, thereby connecting the second front and rear shield parts 63, 66 to each other.

The first and second rear shield parts 65, 66 are arranged farther from the ABS 30 than are the first and second conductor layers 51, 52, respectively. The second rear shield part 66 overlies the first rear shield part 65, so that the first and second rear shield parts 65, 66 form a two-stage structure in which their respective front side faces closer to the ABS 30 are equidistant from the ABS 30.

The upper yoke part 67 is formed so as to be routed from the first rear shield part 65 to the ABS 30 side by bypassing the turn part 52e. The upper yoke part 67 is in contact with a part of the upper end face 26d of the main magnetic pole layer 26, the gap layer 27, the nonmagnetic layers 31, 32, and the insulating layer 33.

The lower interlayer insulating layer 21 is arranged between the first and second conductor layers 11, 12 between the first front and rear shield parts 41, 44. The lower interlayer insulating layer 21 is in direct contact with the first conductor layer 11 and the surface of the photoresist layer 15, while having a uniform thickness as a whole.

The upper interlayer insulating layer 35 is arranged between the first and second conductor layers 51, 52 between the first front and rear shield parts 62, 65. The upper interlayer insulating layer 35 is in direct contact with the surface of the first conductor layer 51, while having a uniform thickness as a whole. The first lower opposing insulating layer 20 is arranged on the ABS 30 side of the first front shield part 41. The second lower opposing insulating layer 23 is arranged on the ABS 30 side of the second front shield part 42.

As in the foregoing, the thin-film magnetic head 300 has the lower thin-film coil 10 and upper thin-film coil 50. The lower and upper thin-film coils 10, 50 have (2+1) and (1+2) turn structures, respectively. Therefore, each of the lower and upper thin-film coils 10, 50 can secure 3 turns, while having only 1 or 2 turns per plane. This allows the thin-film magnetic head 300 to reduce the depth from the ABS 30 and make the magnetic path length LM shorter as compared with the case where turn parts are arranged in a row in a direction intersecting the ABS so as to secure 3 turns as in the conventional thin-film magnetic head 400.

Hence, the thin-film magnetic head 300 can improve the flux rise time, nonlinear transition shift (NLTS) characteristic, overwrite characteristic, and the like of the recording head, and follow rapid changes in recording signals having a high frequency and changing fast. This makes the thin-film magnetic head 300 suitable as a recording head for hard disk drives mounted to servers in particular.

Figure 25:
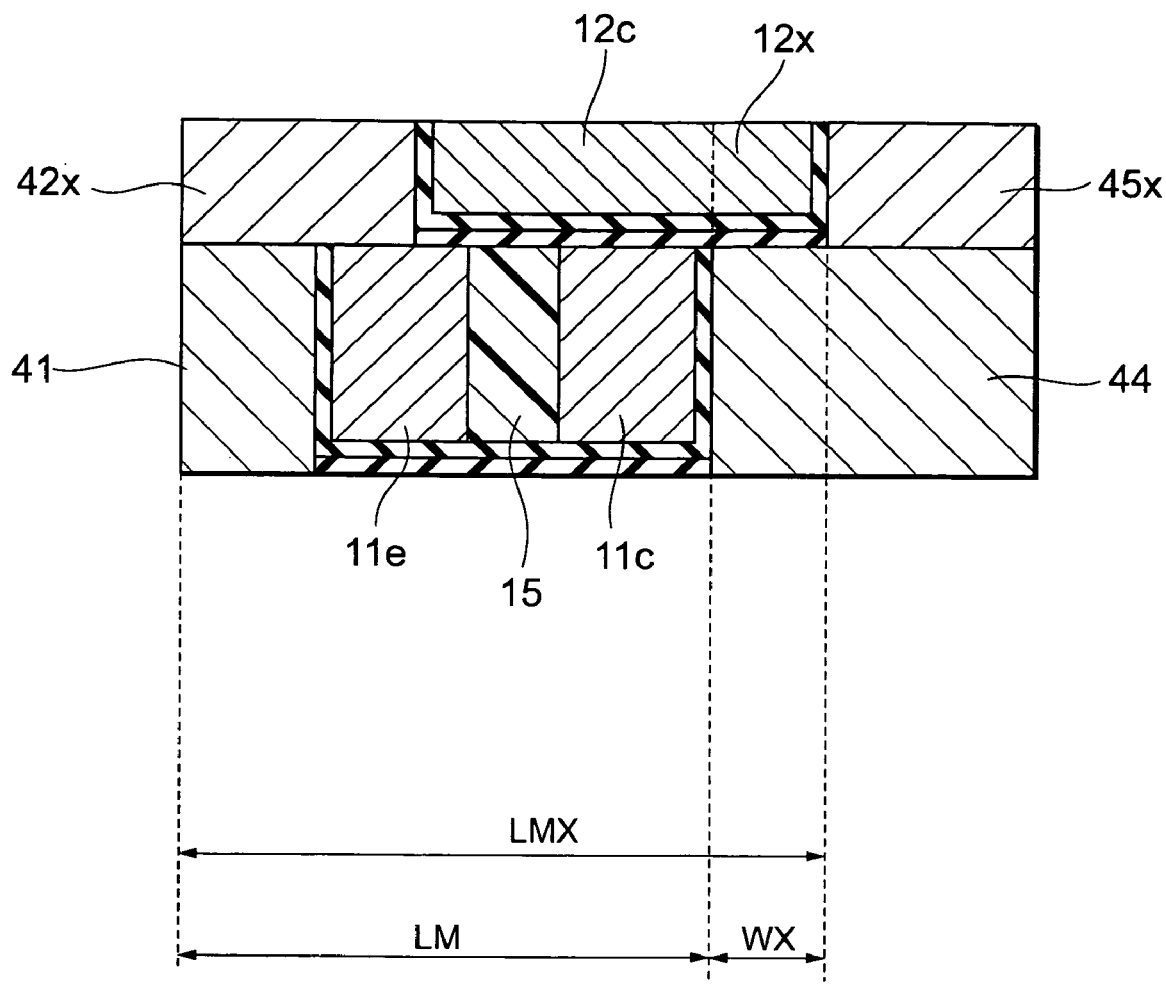
FIG. 25 is a sectional view showing turn parts of a lower thin-film coil in a thin-film magnetic head related to the present invention.

In particular, each of the lower and upper thin-film coils 10, 50 has the above-mentioned equidistant two-stage structure. In this regard, a two-stage structure in which the second conductor layer 12 is simply stacked on the first conductor layer 11 may yield a vertically nonoverlapping part (nonmultiple part) in a part of the first conductor layer 11 or second conductor layer 12. When a turn part 12c distanced more from the ABS 30 than is the first conductor layer 11 is formed between a second front shield part 42x and a second rear shield part 45x as shown in FIG. 25, for example, a nonmultiple part 12x not overlapping the first conductor layer 11 is formed in the turn part 12c. In this case, the existence of the nonmultiple part 12x increases the depth of the lower thin-film coil 10 from the ABS 30, thereby making the magnetic path length LMX greater than the magnetic path length LM by WX.

Therefore, the thin-film magnetic head 300 employs an equidistant two-stage structure having the same front distance and the same rear distance, so that the first and second conductor layers 11, 12, 51, 52 have both of their front and rear side faces aligned. This inhibits the thin-film magnetic head 300 from yielding the nonmultiple part 12x, so that the magnetic path length LM can be made shorter, whereby the flux rise time and the like of the recording head can further be improved.

Also, since the lower and upper thin-film coils 10, 50 have the respective two-stage structures by the first and second conductor layers 11, 12, 51, 52, the number of turns can be increased even when the magnetic path length is the same. Therefore, each turn part can be made wider in the lower and upper thin-film coils 10, 50. This lowers the electric resistance when a current flows through the first and second conductor layers 11, 12, whereby the amount of heat generated by the first and second conductor layers 11, 12 can be suppressed.

Therefore, even when a current is caused to flow through the lower and upper-thin-film coils 10, 50, the photoresist layers 15, 55 are harder to be expanded by the heat generated by the lower and upper thin-film coils 10, 50. This makes it difficult for the first front shield parts 41, 63 to be pushed out toward the ABS 30.

Hence, the thin-film magnetic head 300 can restrain the lower shield layer 40 and upper shield layer 60 from projecting as the lower and upper thin-film coils 10, 50 generate heat. Consequently, the thin-film magnetic head 300 is very unlikely to be damaged by the projection of the recording head and thus can approach recording media.

While the thin-film magnetic head 300 is incorporated in an undepicted slider, the flying height of the slider from the recording medium surface can be reduced. Therefore, the thin-film magnetic head 300 can enhance the resolution of recording and reproducing heads, thereby improving their signal-to-noise ratio. A structure such as that of the thin-film magnetic head 300 can also increase the yield of PMR having a high recording density.

In the case of the thin-film magnetic head 300 in particular, the number of turns is smaller in the second conductor layer 12 than in the first conductor layer 11, whereby the turn part 12c in the second conductor layer 12 can be made wider than the turn part 11c. This can make the current flow less likely to be obstructed even when the turn part 12c is made thinner, whereby the heat generated by the lower thin-film coil 10 can be reduced. Also, the number of turns in the first conductor layer 51 is made smaller than that in the second conductor layer 52, so as to widen the turn part 51c, whereby a current is easier to flow through the upper thin-film coil 50. Therefore, the heat generated by the upper thin-film coil 50 is further reduced. The turn part 51c has a horizontally long structure in which the height is smaller than the width, whereby the first and second front shield parts 62, 63 can be made lower as a whole. This allows a magnetic flux to return to the upper shield layer 60 from an undepicted recording medium, whereby the effective magnetic path can be made shorter.

Since the lower and upper thin-film coils 10, 50 have the variable width structures as mentioned above, current flows are less likely to be obstructed, whereby the resistance value can be restrained from rising. Therefore, the thin-film magnetic head 300 can effectively suppress the heat generated by the lower and upper thin-film coils 10, 50. Though the lower and upper thin-film coils 10, 50 have the same number of turns, the upper thin-film coil 50 is more influential on performances of the thin-film magnetic head than the lower thin-film coil 10, while the lower thin-film coil 10 is effective in improving Far Track ATE. Consequently, though not depicted, it will be preferred if the number of turns in the upper thin-film coil 50 is increased, e.g., to 4. Here, the Far Track ATE refers to ATE (Adjacent Track Erase; a phenomenon of erasing recorded magnetic data) which occurs at a position separated from the main magnetic pole layer 26 by 2 or 3 tracks.

Method of Manufacturing Thin-Film Magnetic Head

A method of manufacturing the thin-film magnetic head 300 in accordance with the first embodiment having the structure mentioned above will now be explained with reference to FIGS. 5A and 5B to 17A and 17B together with FIGS. 1A and 1B mentioned above.

FIGS. 5A to 17A are sectional views corresponding to FIG. 1A in respective steps of manufacturing the thin-film magnetic head 300, while FIGS. 5B to 17B are sectional views similarly corresponding to FIG. 1B.

First, the substrate 1 made of a ceramic material such as aluminum oxide-titanium carbide ($Al_2O_3.TiC$) is prepared. Subsequently, as shown in FIGS. 5A and 5B, the insulating layer 2 made of an insulating material such as alumina ($Al_2O_3$) and the lower shield layer 3 made of a magnetic material are successively laminated on the substrate 1. Then, the shield gap film 4 is formed by an insulating material such as to shield the M device 5. Here, an undepicted lead connected to the MR device 5 is formed, and the MR device 5 and lead are covered with the shield gap film 4. Thereafter, using a magnetic material, the upper shield layer 6 is formed on the shield gap film 4.

Next, the insulating layer 7 for separating the upper shield layer 6 and a recording head to be formed later from each other is formed by an insulating material such as alumina ($Al_2O_3$). The foregoing steps yield a multilayer body for forming the recording head. Thereafter, a magnetic layer (having a thickness of about 0.5 μm) for forming the connecting shield part 43 is formed by NiFe or CoNiFe, so as to form an insulating layer on the surface of the multilayer body, and the surface of the multilayer body is flattened by CMP. This forms a lower opposing insulating layer 17 and the connecting shield layer part 43. Here, the connecting shield part 43 is formed such as to be separated from the ABS 30 by 0.3 to 1 μm (about 0.6 μm in this embodiment).

Subsequently, an insulating layer 18 (having a thickness of about 0.2 to 0.3 μm) made of alumina ($Al_2O_3$) is formed on the whole surface of the multilayer body. Then, after applying a photoresist to the whole surface of the multilayer body, patterning is performed with a predetermined photomask, so as to form a resist pattern (not depicted). Using this resist pattern as a mask, etching such as RIE is performed, so as to selectively perforate the insulating layer 18. Thereafter, by frame plating with NiFe or CoNiFe, the first front and rear shield parts 41, 44 are formed by a thickness of about 2 μm each.

Next, as shown in FIGS. 6A and 6B, an insulating layer 19 (having a thickness of about 0.02 to 0.3 μm, preferably about 0.1 to 0.2 μm) made of alumina ($Al_2O_3$) is formed on the whole surface of the multilayer body by CVD (Chemical Vapor Deposition) according to an atomic layer method so as to cover the first front and rear shield parts 41, 44. The insulating layer 19 will later become the first lower intermediate insulating layer 19. Then, a conductor layer 70 is formed between the first front and rear shield parts 41, 44 by frame plating. The conductor layer 70 will later become the first conductor layer 11. The conductor layer 70 is formed between the first front and rear shield parts 41, 44 such as to have an interstice 70a at the center and come into contact with the first front and rear shield parts 41, 44 through the insulating layer 19 without gaps. The conductor layer 70 is an intermittent conductor layer, since it is provided with one interstice 70a at the center. The conductor layer 70 will later form the first conductor layer 11 in a self-aligning fashion.

Thereafter, as shown in FIGS. 7A and 7B, a photoresist layer 80 (having a thickness of about 2 to 3 μm) is formed at the interstice 70a in the conductor layer 70, and a cover insulating film 20 adapted to cover the surface of the multilayer body is formed from alumina ($Al_2O_3$) by a thickness of about 3 to 4 μm. Subsequently, the surface of the multilayer body is polished by CMP until the first front and rear shield parts 41, 44 emerge, so as to become flat. This forms the first conductor layer 11 as shown in FIGS. 8A and 8B. Here, the thickness of the first conductor layer 11 is set to about 1.2 to 1.8 μm. The first lower opposing insulating layer 20 is also formed on the ABS 30 side of the first front shield part 41.

Subsequently, as shown in FIGS. 9A and 9B, an insulating layer (having a thickness of about 0.1 to 0.15 μm) made of alumina ($Al_2O_3$) is formed on the whole surface of the multilayer body, and then selectively perforated. This insulating layer will later become the lower interlayer insulating layer 21. Then, by frame plating with NiFe or CoNiFe, the second front and rear shield parts 42, 45 are formed by a thickness of about 0.7 to 1.5 μm each so as to overlie the perforated parts. Further, an insulating layer 22 (having a thickness of about 0.1 to 0.15 μm) made of alumina ($Al_2O_3$) is formed on the whole surface of the multilayer body by CVD according to the atomic layer method so as to cover the second front and rear shield parts 42, 45. This insulating layer 22 will later become the second lower intermediate insulating layer 22.

Next, as shown in FIGS. 10A and 10B, a conductor layer 71 is formed on the surface of the multilayer body at a position separated from the ABS 30 equidistantly as the first conductor layer 11. This conductor layer 71 will later become the second conductor layer 12. Further, a cover insulating film 23 adapted to cover the surface of the multilayer body is formed from alumina ($Al_2O_3$) by a thickness of about 2 to 3 μm. Subsequently, the surface of the multilayer body is polished by CMP until the second front and rear shield parts 42, 45 emerge, so as to become flat. This forms the second conductor layer 12 as shown in FIGS. 11A and 11B. Here, the surface of the multilayer body is polished such that the conductor layer 71 has a thickness of about 0.6 to 1.2 μm. The foregoing steps form the lower thin-film coil 10 having an equidistant two-stage structure. The second lower opposing insulating layer 23 is also formed on the ABS 30 side of the second front shield part 42.

Next, as shown in FIGS. 12A and 12B, an insulating layer is formed on the surface of the multilayer body by an insulating material such as alumina ($Al_2O_3$), and the surface of the second rear shield part 45 and the like are partly perforated, so as to form an intermediate insulating layer 24. Subsequently, a base insulating layer 25 is formed by an insulating material such as alumina ($Al_2O_3$). Then, after applying a photoresist to the surface of the multilayer body, patterning with a predetermined photomask is performed, so as to form a resist pattern through which the surface of the multilayer body is exposed as a form corresponding to a cavity 90 which will be explained later.

Figure 20A:
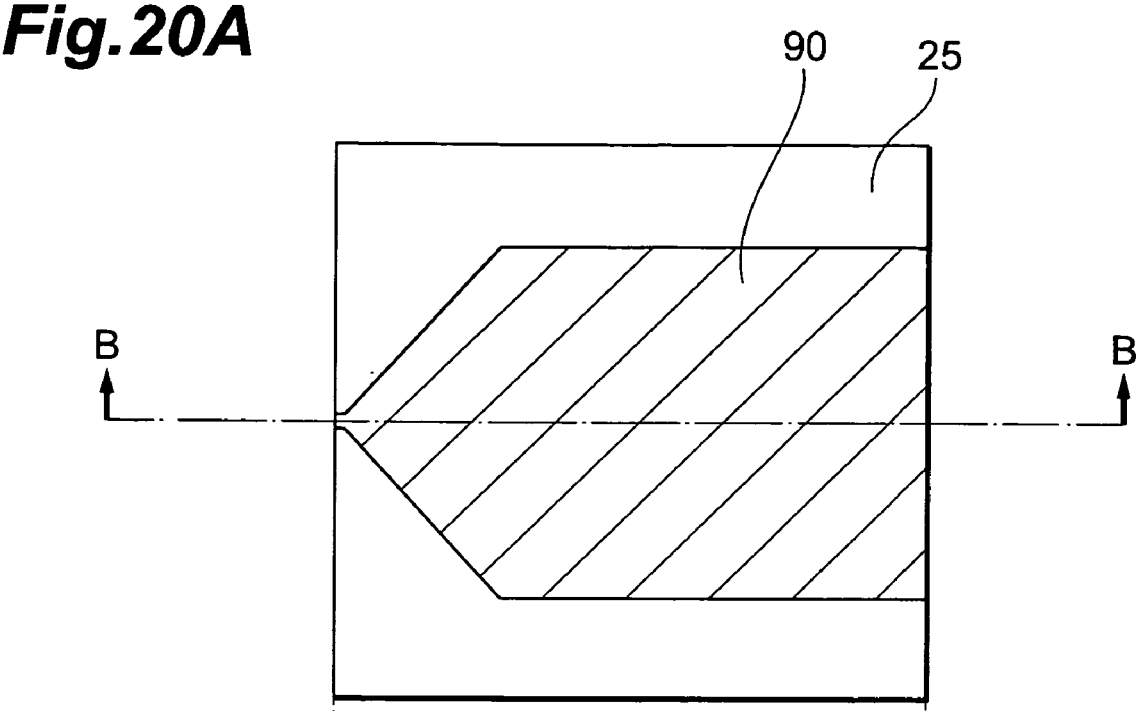
Figure 20B:
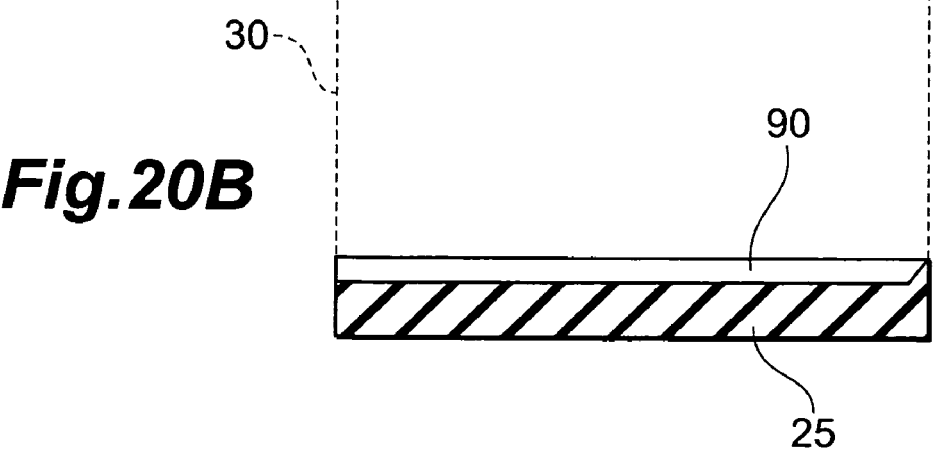
FIG. 20B is a sectional view taken along the line B-B of FIG. 20A.

Next, using this resist pattern as a mask, reactive ion etching (which will hereinafter be referred to as "RIE") is performed, so as to remove the part of the surface of the multilayer body not covered with the resist pattern. This forms the cavity 90 in the base insulating layer 25. For forming the main magnetic pole layer 26 with designed size and form, the cavity 90 is made by depressing a part of the base insulating layer 25 into a form corresponding to the outer form of the main magnetic pole layer 26 as shown in FIGS. 20A and 20B.

Subsequently, by sputtering with a magnetic material such as CoNiFe, CoFe, or NiFe, a magnetic layer 75 is formed on the whole surface of the multilayer body by a thickness of about 0.5 to 0.8 μm. This magnetic layer 75 will later form the main magnetic pole layer 26. Then, the whole surface of the multilayer body is polished by CMP, so as to become flat, whereby the main magnetic pole layer 26 is formed.

Thereafter, a nonmagnetic layer 72 (having a thickness of about 0.04 to 1.2 μm) is formed on the whole surface of the multilayer body by sputtering with a metal material such as Ru, NiCr, or NiCu. The nonmagnetic layer 72 will later be partly etched away, so as to become the above-mentioned nonmagnetic layer 31. Further, a nonmagnetic layer 73 (having a thickness of about 0.1 to 0.3 μm) is formed on the whole surface of the multilayer body by an inorganic insulating material such as alumina ($Al_2O_3$) or an oxide of silicon. The nonmagnetic layer 73 will later be partly etched away, so as to become the above-mentioned nonmagnetic layer 32.

Subsequently, after applying a photoresist to the whole surface of the multilayer body, patterning with a predetermined photomask is performed, so as to form a resist pattern 81 near the ABS 30.

Next, using the resist pattern 81 as a mask, etching such as RIE, for example, is performed, so as to remove a part of the nonmagnetic layer 73. The etching in this case is effected such as to stop at the time when the bottom part of a groove formed by etching reaches the upper face of the nonmagnetic layer 72. To this aim, a material yielding an etching rate lower than that of the nonmagnetic layer 72 is used for the nonmagnetic layer 73.

Subsequently, the resist pattern 81 is removed. Then, using the remaining nonmagnetic layer 73 as a mask, a part of the nonmagnetic layer 72 is etched away by IBE, for example. Further, using the remaining nonmagnetic layer 72 as a mask, a part of the nonmagnetic layer 75 is etched away by IBE, for example. This step forms the tilted surface 26b on the ABS side of the magnetic layer 75.

Subsequently, the gap layer 27 (having a thickness of about 250 to 350 Å) is formed on the whole surface of the multilayer body by sputtering or CVD with an insulating material such as alumina ($Al_2O_3$) or a nonmagnetic conductive material such as Ru, NiCu, or Ta.

Further, an undepicted stopper film is formed by sputtering, for example, and a nonmagnetic film is formed thereon. Subsequently, an undepicted photoresist is applied to the whole surface of the multilayer body. Then, patterning with a predetermined photomask is performed, so as to form an undepicted resist pattern. Using this resist pattern as a mask, the nonmagnetic film is etched by RIE, for example. The etching is effected such as to stop when the bottom part of a groove formed by etching reaches the upper face of the stopper film. Then, after removing the resist pattern that is not depicted, the remaining film is used as a mask for partly etching the gap layer 27 and nonmagnetic layers 72, 73 away by RIE or the like. Here, the gap layer 27 and nonmagnetic layers 72, 73 are partly removed, so as to secure a space for forming the above-mentioned upper yoke part 67.

Next, a magnetic layer having a thickness of about 0.5 to 1.0 μm is formed on the whole surface of the multilayer body by plating with a magnetic material such as CoNiFe, CoFe, CoFeN, or NiFe. This magnetic layer will later become the opposing shield part 61 and upper yoke part 67. Subsequently, an insulating layer (having a thickness of about 1 to 3 μm) is formed on the whole surface of the multilayer body by an insulating material such as alumina ($Al_2O_3$). Further, the whole surface of the multilayer body is polished by CMP, so as to become flat. This forms the opposing shield part 61, upper yoke part 67, and insulating layer 33 as shown in FIGS. 13A and 13B. Here, the surface of the multilayer body is polished such that the opposing shield part 61 has a thickness of about 0.3 to 0.7 μm.

Next, as shown in FIGS. 14A and 14B, an insulating layer 34a (having a thickness of about 0.1 to 0.15 μm) is formed on the whole surface of the multilayer body by alumina ($Al_2O_3$), and then selectively perforated. Subsequently, by frame plating with NiFe or CoNiFe, the first front and rear shield parts 62, 65 are formed by a thickness of about 1.0 to 1.5 μm in the perforated parts. Further, an insulating layer 34b (having a thickness of about 0.02 to 0.3 μm, preferably about 0.1 to 0.15 μm) made of alumina ($Al_2O_3$) is formed on the whole surface of the multilayer body by CVD according to the atomic layer method. The insulating layer 34b will later become the first upper intermediate insulating layer 34b.

Next, a conductor layer is formed between the first front and rear shield parts 62, 65 on the surface of the multilayer body. This conductor layer will later become the first conductor layer 51. Further, a cover insulating film adapted to cover the surface of the multilayer body is formed from alumina ($Al_2O_3$) by a thickness of about 2 to 3 μm. Subsequently, the surface of the multilayer body is polished by CMP until the first front and rear shield parts 62, 65 emerge, so as to become flat. This forms the first conductor layer 51. Here, the surface of the multilayer body is polished such that the conductor layer has a thickness of about 0.7 to 1.5 μm.

Figure 15A:
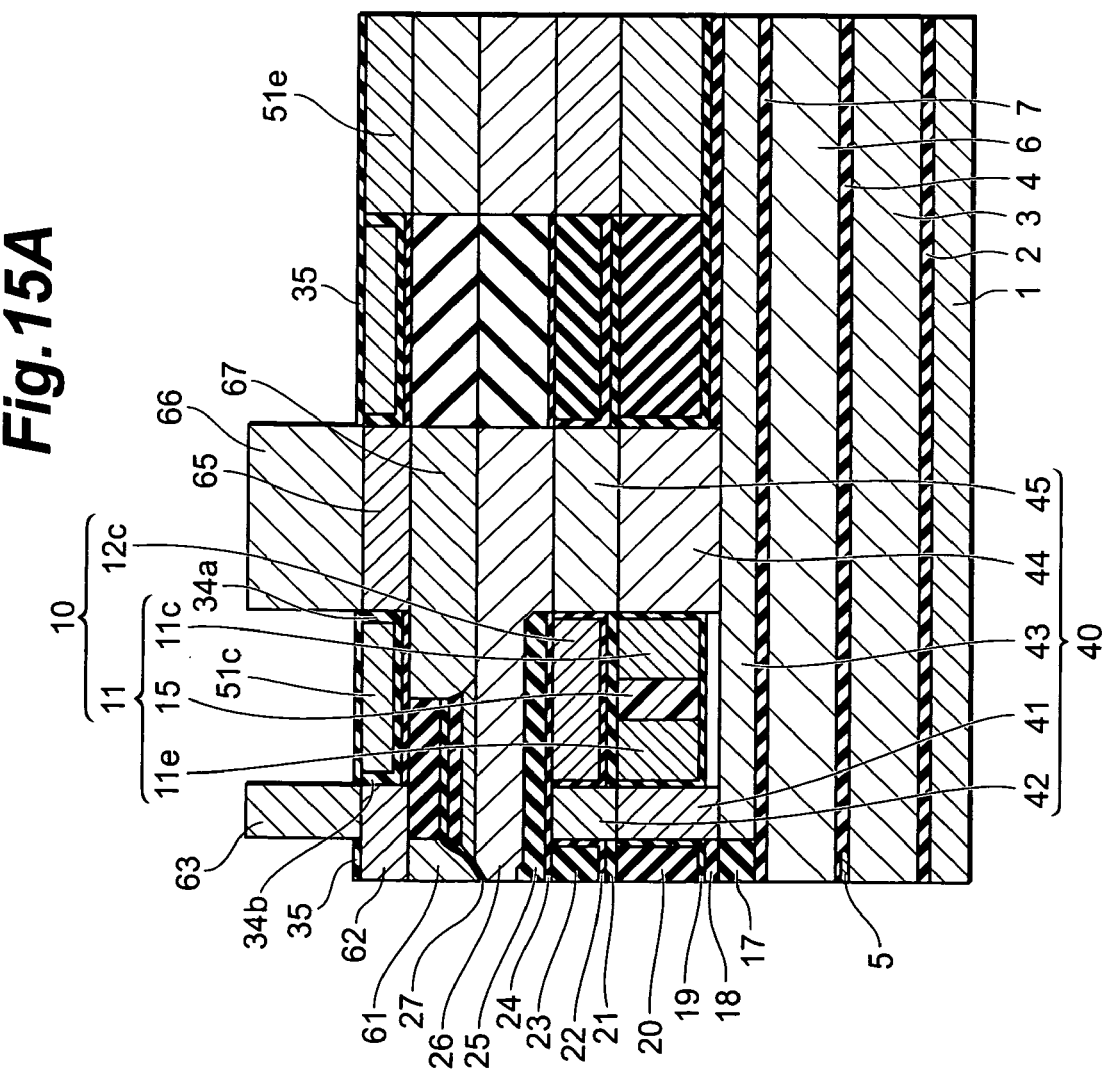

Next, an insulating layer (having a thickness of about 0.2 to 0.3 μm) is formed on the whole surface of the multilayer body by alumina ($Al_2O_3$), and then selectively perforated as shown in FIGS. 15A and 15B. This insulating layer will later become the upper interlayer insulating layer 35. Subsequently, by frame plating with NiFe or CoNiFe, the second front and rear shield parts 63, 66 are formed by a thickness of about 2 μm.

Next, as shown in FIGS. 16A and 16B, an insulating layer 36 (having a thickness of about 0.02 to 0.3 μm, preferably about 0.1 to 0.2 μm) made of alumina ($Al_2O_3$) is formed on the whole surface of the multilayer body by CVD according to the atomic layer method. The insulating layer 36 will later become the second upper intermediate insulating layer 36.

Next, a conductor layer 76 is formed between the second front and rear shield parts 63, 66 by frame plating. This conductor layer 76 will later become the second conductor layer 52. The conductor layer 76 is formed between the second front and rear shield parts 63, 66 such as to have an interstice 76a at the center and come into contact with the second front and rear shield parts 63, 66 through the insulating layer 36 without gaps. The conductor layer 76 is an intermittent conductor layer, since it is provided with one interstice 76a at the center.

Thereafter, as shown in FIGS. 17A and 17B, a photoresist layer 82 (having a thickness of about 2 to 3 μm) is formed at the interstice 76a in the conductor layer 76, and a cover insulating film 37 adapted to cover the surface of the multilayer body is formed from alumina ($Al_2O_3$) by a thickness of about 3 to 4 μm. Subsequently, the surface of the multilayer body is polished by CMP until the second front and rear shield parts 63, 66 emerge, so as to become flat. This forms the second conductor layer 52 as shown in FIGS. 1A and 1B. Here, the thickness of the second conductor layer 52 is set to about 1.2 to 1.8 μm.

Subsequently, an insulating layer 38 is formed on the whole surface of the multilayer body by an insulating material such as alumina ($Al_2O_3$), and then partly perforated. Further, the connecting shield part 64 is formed by frame plating such as to straddle the insulating layer 38. Thereafter, a cover insulating layer 39 is formed by an insulating material such as alumina ($Al_2O_3$) so as to cover the whole surface of the multilayer body, whereby the thin-film magnetic head 300 is completed.

Thus manufactured thin-film magnetic head 300 can make the magnetic path length shorter while securing a large number of turns, since each of the lower and upper thin-film coils 10, 50 has an equidistant two-stage structure.

While the thin-film magnetic head 300 has the lower and upper thin-film coils 10, 50 as in the foregoing, the above-mentioned manufacturing process forms the intermittent conductor layers 70, 76, each provided with only one interstice at the center thereof, when forming the first conductor layer 11 of the lower thin-film coil 10 and the second conductor layer 52 of the upper thin-film coil 50, respectively.

Figure 19:
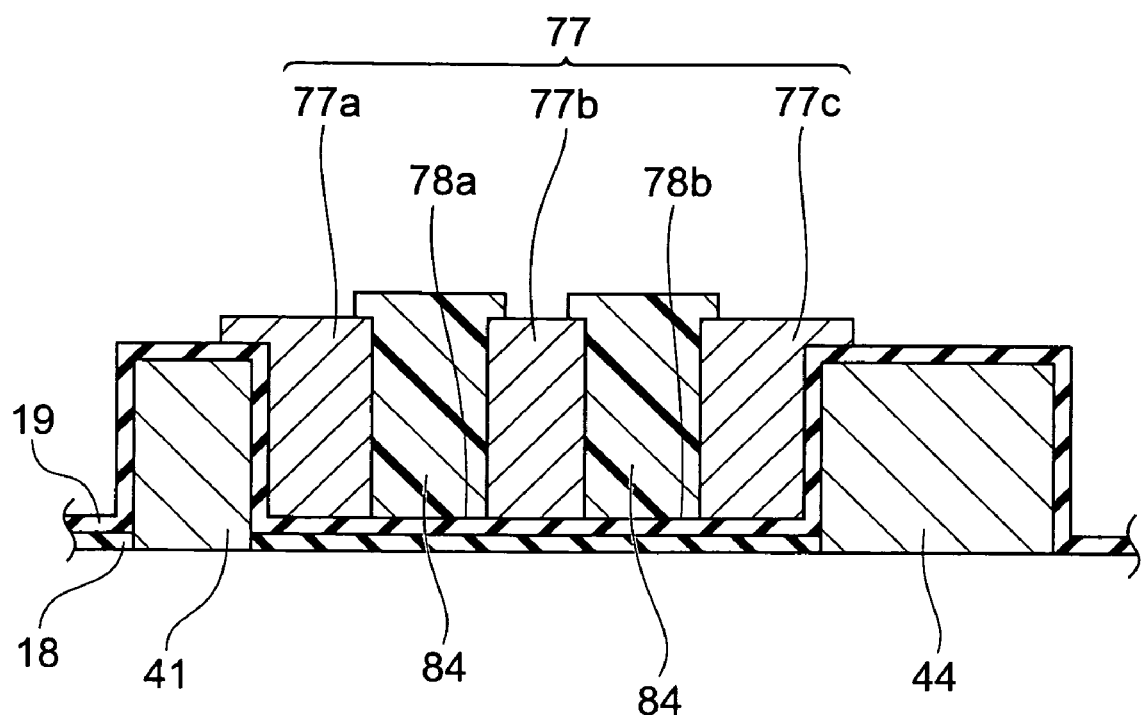
FIG. 19 is a sectional view showing a main part in a manufacturing step when forming an intermittent conductor layer equipped with two interstices.

Suppose that the above-mentioned first conductor layer 11 is formed by 3 turns. In this case, as shown in FIG. 19, an intermittent conductor layer 77 provided with two interstices 78a, 78b is formed between the first front and rear shield parts 41, 44. The intermittent conductor layer 77 has a conductor layer 77a in contact with the first front shield part 41 through the first lower intermediate insulating layer 19, a conductor layer 77c in contact with the first rear shield part 44 through the first lower intermediate insulating layer 19, and a conductor layer 77b arranged at the center.

Subsequently, a photoresist layer 84 is formed in the interstices 78a, 78b, an undepicted cover insulating film is formed thereafter, and then the multilayer surface is flattened by CMP, whereby the first conductor layer 11 is formed by 3 turns.

When the surface of the multilayer body is exposed to light so as to remove the photoresist layer 84 in this case, however, the light reflected by the conductor layers 77a, 77c on both sides may affect the conductor layer 77b arranged at the center, thereby making the conductor layer 77b easier to collapse.

Therefore, when forming the first conductor layer 11 by a plurality of turns, it will be preferred if the intermittent conductor layer 70 provided with only one interstice 70a at the center is formed, so as to yield 2 turns. This can reliably form the 2-turn first conductor layer 11. The same holds when forming the second conductor layer 52 by a plurality of turns.

Second Embodiment

Figure 21:
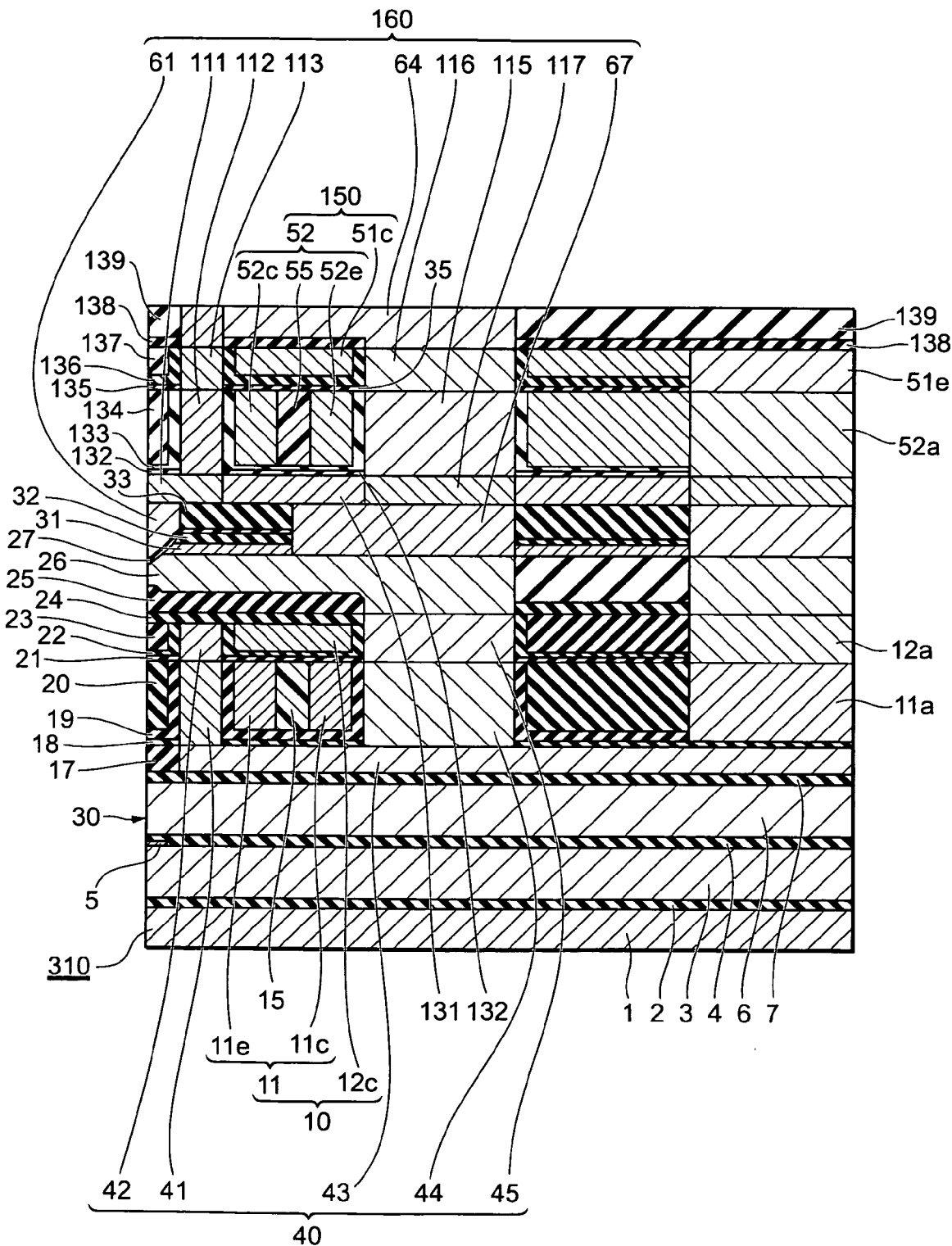
FIG. 21 is a sectional view, corresponding to FIG. 1A, of the thin-film magnetic head in accordance with a second embodiment of the present invention taken along a direction intersecting the ABS.

The structure of a thin-film magnetic head of perpendicular magnetic recording type in accordance with the second embodiment of the present invention will now be explained with reference to FIG. 21. FIG. 21 is a sectional view, corresponding to FIG. 1A, of the thin-film magnetic head 310 in accordance with the second embodiment of the present invention taken along a direction intersecting the ABS 30.

As with the thin-film magnetic head 300, the thin-film magnetic head 310 comprises a substrate 1 and reproducing and recording heads laminated on the substrate 1, while having the ABS 30. Since the thin-film magnetic head 310 includes configurations identical to those of the thin-film magnetic head 300, configurations of the thin-film magnetic head 310 different from those of the thin-film magnetic head 300 will mainly be explained in the following, while omitting or simplifying their common configurations.

As in the thin-film magnetic head 300, the reproducing head includes an insulating layer 2, a lower shield layer 3, a shield gap film 4, an MR device 5, an upper shield layer 6, and an insulating layer 7 which are formed on the substrate 1.

The recording head includes a lower thin-film coil 10, a main magnetic pole layer 26, a gap layer 27, a lower shield layer 40, an upper thin-film coil 150, and an upper shield layer 160 which are laminated on the substrate 1. The recording head differs from that of the first embodiment mainly in that it has the upper thin-film coil 150 and upper shield layer 160.

The upper thin-film coil 150 differs from the upper thin-film coil 50 in that the vertical arrangement of the first and second conductor layers 51, 52 is reversed. Namely, while including the first and second conductor layers 51, 52 as with the upper thin-film coil 50, the upper thin-film coil 150 has an equidistant two-stage structure in which the first conductor layer 51 overlies the second conductor layer 52 while interposing the upper interlayer insulating layer 35 therebetween. That is, the upper thin-film coil 150 has a (2+1) turn structure in which the second conductor layer 52 forms a 2-turn loop, and the first conductor layer 51 positioned directly thereabove forms a 1-turn loop, thereby yielding a 3-turn loop.

The upper shield layer 60 has an opposing shield part 61, intermediate shield parts 111, 117, a first front shield part 112, a second front shield part 113, a connecting shield part 64, a first rear shield part 115, a second rear shield part 116, and an upper yoke part 67.

The intermediate shield part 111 is arranged on the ABS 30 side of the second and first conductor layers 52, 51. The intermediate shield part 111 has an end face exposed at the ABS 30 and an upper face connected to the first front shield part 112.

The first and second front shield parts 112, 113 are arranged on the ABS 30 side of the second and first conductor layers 52, 51, respectively. The second front shield part 113 overlies the first front shield part 112, so that the first and second front shield parts 112, 113 exhibit a two-stage structure in which their rear side faces farther from the ABS 30 are equidistant from the ABS 30.

The first and second rear shield parts 115, 116 are arranged at positions distanced more from the ABS 30 than are the second and first conductor layers 52, 51, respectively. The second rear shield part 116 overlies the first rear shield part 115, so that the first and second rear shield parts 115, 116 exhibit a two-stage structure in which their front side faces closer to the ABS 30 are equidistant from the ABS 30.

The intermediate shield part 117 is arranged at a position distanced more from the ABS 30 than are the second and first conductor layers 52, 51. The intermediate shield part 117 is arranged between the first rear shield part 115 and the upper yoke part 67.

The thin-film magnetic head 310 further includes an insulating layer 131 arranged between the intermediate shield parts 111, 117, an insulating layer 132, a first upper intermediate insulating layer 133, a first upper opposing insulating layer 134, a second upper intermediate insulating layer 136, a second upper opposing insulating layer 137, an insulating layer 138, and an insulating layer 139.

In thus constructed thin-film magnetic head 310, each of the lower thin-film coil 10 and upper thin-film coil 150 has an equidistant two-stage structure as in the thin-film magnetic head 300, and thus secures 3 turns, while having only 1 or 2 turns per plane. Therefore, as with the thin-film magnetic head 300, the thin-film magnetic head 310 can reduce the depth from the ABS 30, and make the magnetic path length as short as possible. Hence, the thin-film magnetic head 310 can follow rapid changes in recording signals having a high frequency and changing fast, and is suitable as a recording head for hard disk drives mounted to servers in particular.

Also, the thin-film magnetic head 310 can restrain the lower shield layer 40 and upper shield layer 160 from projecting as the lower and upper thin-film coils 10, 150 generate heat, and thus can approach recording media.

Third Embodiment

Figure 22:
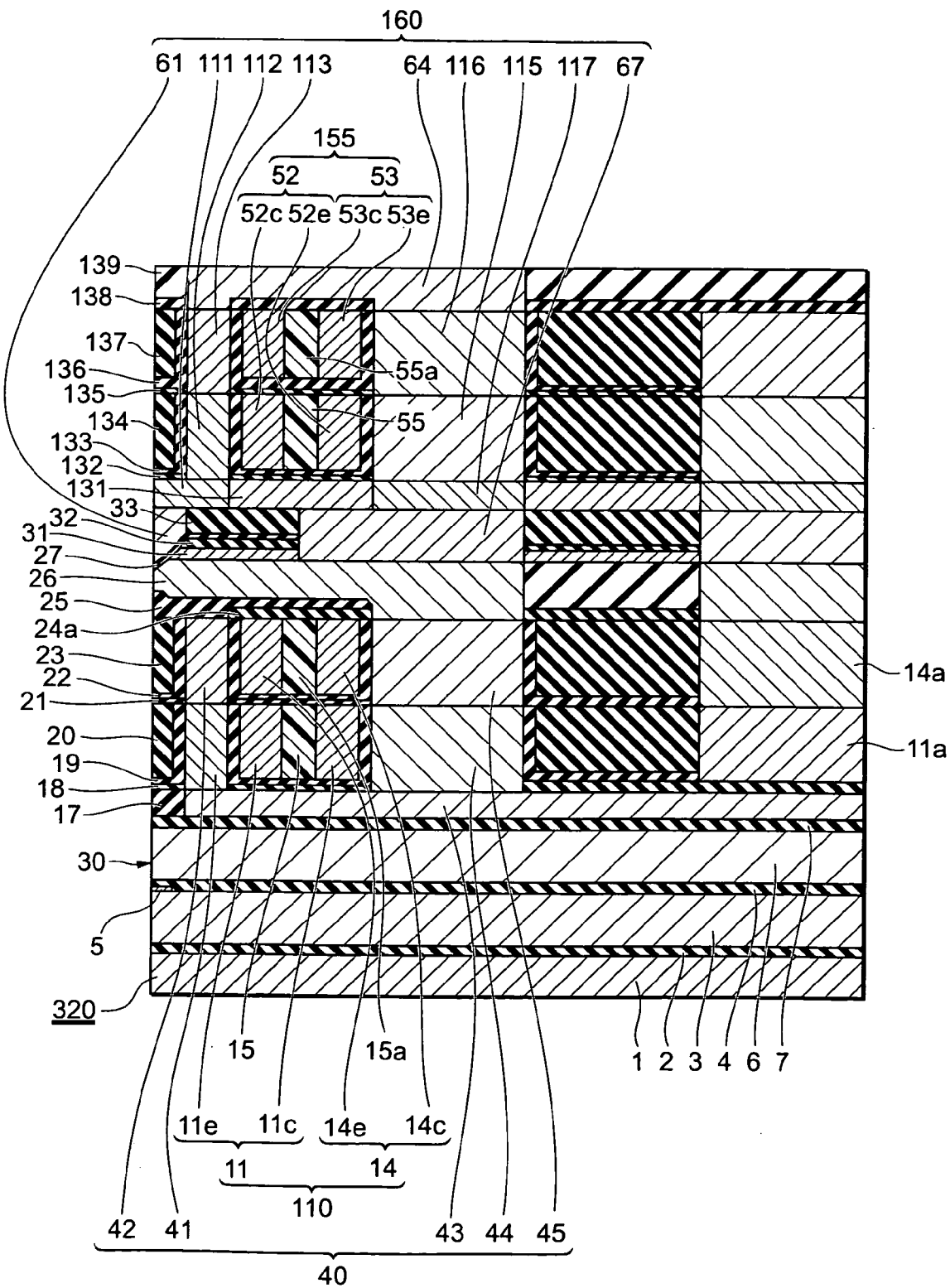
FIG. 22 is a sectional view, corresponding to FIG. 1A, of the thin-film magnetic head in accordance with a third embodiment of the present invention taken along a direction intersecting the ABS.

The structure of a thin-film magnetic head of perpendicular magnetic recording type in accordance with the third embodiment of the present invention will now be explained with reference to FIG. 22. FIG. 22 is a sectional view, corresponding to FIG. 1A, of the thin-film magnetic head 320 in accordance with the third embodiment of the present invention taken along a direction intersecting the ABS 30.

As with the thin-film magnetic head 310, the thin-film magnetic head 320 comprises a substrate 1 and reproducing and recording heads laminated on the substrate 1, while having the ABS 30. The thin-film magnetic head 320 differs from the above-mentioned thin-film magnetic head 310 only in the configuration of the recording head. In the following explanations, configurations of the thin-film magnetic head 320 different from those of the thin-film magnetic head 310 will mainly be explained, while omitting or simplifying their common configurations.

The recording head includes a lower thin-film coil 10, a main magnetic pole layer 26, a gap layer 27, a lower shield layer 40, an upper thin-film coil 155, and an upper shield layer 160 which are laminated on the substrate 1. The recording head differs from that of the second embodiment mainly in that it has the lower thin-film coil 110 and upper thin-film coil 155.

The lower thin-film coil 110 includes a first conductor layer 11 and a second conductor layer 14, and has an equidistant two-stage structure in which the second conductor layer 14 overlies the first conductor layer 11 while interposing the lower interlayer insulating layer 21 therebetween. However, the lower thin-film coil 110 differs from the lower thin-film coil 10 in that it has a (2+2) turn structure.

The second conductor layer 14 differs from the second conductor layer 11 in that it has two turn parts 14c, 14e arranged between the second front and rear shield parts 42, 45. The second conductor layer 14 also includes a connecting part 14a, while having a photoresist layer 15a between the two turn parts 14c, 14e. The lower thin-film coil 110 has a (2+2) turn structure in which the first conductor layer 11 forms a 2-turn loop, and the second conductor layer 14 positioned directly thereabove forms a 2-turn loop, thereby yielding a 4-turn loop.

The upper thin-film coil 155 includes a second conductor layer 52 and a third conductor layer 53, and has an equidistant two-stage structure in which the third conductor layer 53 overlies the second conductor layer 52 while interposing the upper interlayer insulating layer 35 therebetween. However, the upper thin-film coil 155 differs from the upper thin-film coil 150 in that it has a (2+2) turn structure.

The third conductor layer 53 also includes two turn parts 53c, 53e arranged between the second front and rear shield parts 113, 116, while having a photoresist layer 55a between the turn parts 53c, 53e. The upper thin-film coil 155 has a (2+2) turn structure in which the second conductor layer 52 forms a 2-turn loop, and the third conductor layer 53 positioned directly thereabove forms a 2-turn loop, thereby yielding a 4-turn loop.

In thus constructed thin-film magnetic head 320, each of the lower thin-film coil 110 and upper thin-film coil 155 has an equidistant two-stage structure as in the thin-film magnetic head 300, and thus secures 4 turns, while having only 2 turns per plane. Therefore, as with the thin-film magnetic head 310, the thin-film magnetic head 320 can reduce the depth from the ABS 30, and make the magnetic path length as short as possible. Hence, the thin-film magnetic head 320 can follow rapid changes in recording signals having a high frequency and changing fast, and is suitable as a recording head for hard disk drives mounted to servers in particular.

Also, the thin-film magnetic head 320 can restrain the lower shield layer 40 and upper shield layer 160 from projecting as the lower and upper thin-film coils 110, 150 generate heat, and thus can approach recording media.

Fourth Embodiment

Figure 23:
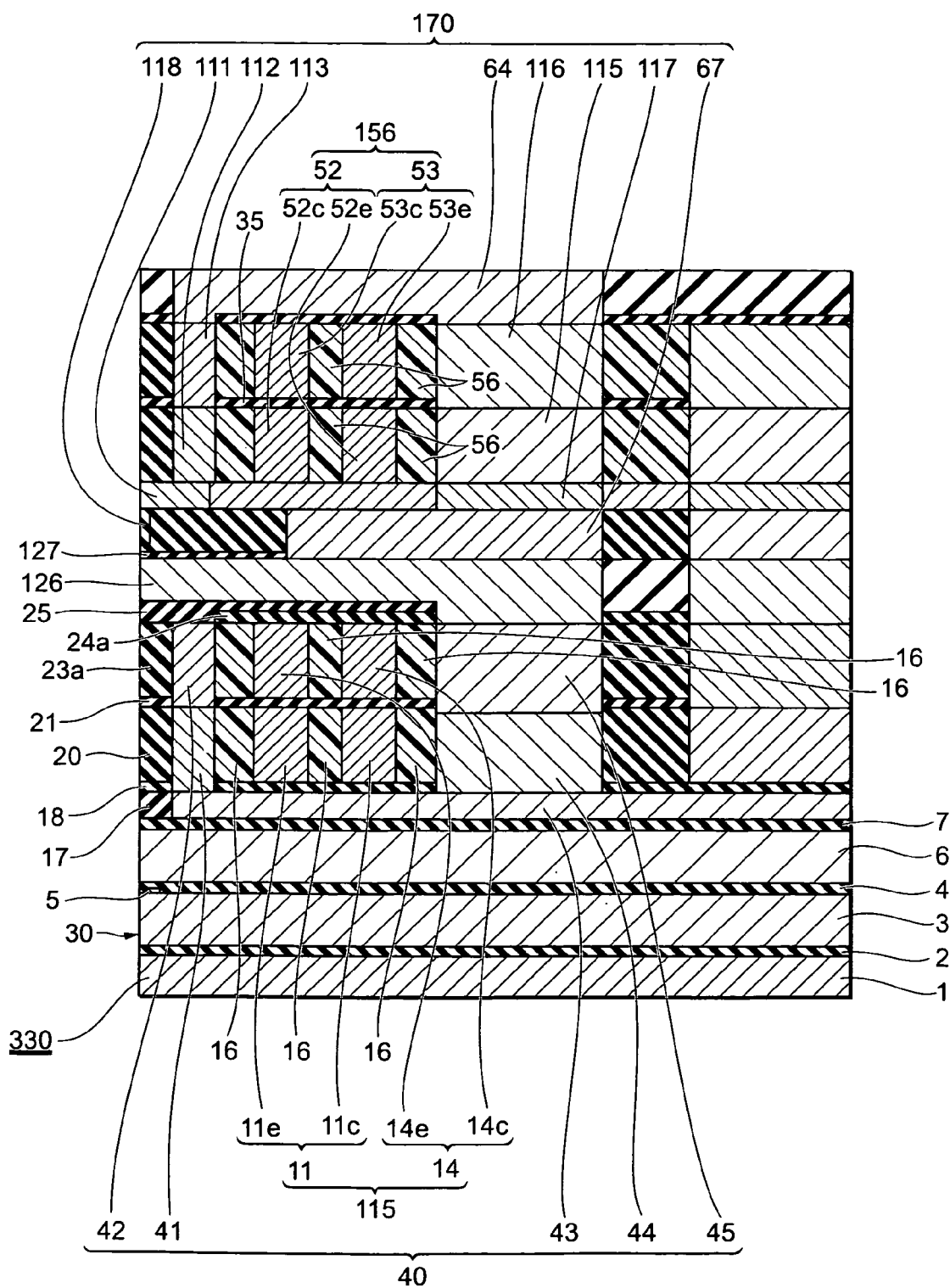
FIG. 23 is a sectional view, corresponding to FIG. 1A, of the thin-film magnetic head in accordance with a fourth embodiment of the present invention taken along a direction intersecting the ABS.

The structure of a thin-film magnetic head of perpendicular magnetic recording type in accordance with the fourth embodiment of the present invention will now be explained with reference to FIG. 23. FIG. 23 is a sectional view, corresponding to FIG. 1A, of the thin-film magnetic head 330 in accordance with the fourth embodiment of the present invention taken along a direction intersecting the ABS 30.

As with the thin-film magnetic head 320, the thin-film magnetic head 330 comprises a substrate 1 and reproducing and recording heads laminated on the substrate 1, while having the ABS 30. The thin-film magnetic head 330 differs from the above-mentioned thin-film magnetic head 320 only in the configuration of the recording head. In the following explanations, configurations of the thin-film magnetic head 330 different from those of the thin-film magnetic head 320 will mainly be explained, while omitting or simplifying their common configurations.

The recording head includes a lower thin-film coil 115, a main magnetic pole layer 126, a gap layer 127, a lower shield layer 40, an upper thin-film coil 156, and an upper shield layer 170 which are laminated on the substrate 1. The recording head differs from that of the third embodiment mainly in that it has the lower thin-film coil 115, upper thin-film coil 156, and upper shield layer 170.

As with the lower thin-film coil 110, the lower thin-film coil 115 includes the first conductor layer 11 and second conductor layer 14, and has an equidistant two-stage structure in which the second conductor layer 14 overlies the first conductor layer 11 while interposing the lower interlayer insulating layer 21 therebetween. However, the lower thin-film coil 115 differs from the lower thin-film coil 110 in that it has photoresist layers 16 on both sides of the turn parts 11e, 11c and turn parts 14e, 14c, while the lower thin-film coil 110 has the photoresist layers 15, 15a at the center.

As with the upper thin-film coil 155, the upper thin-film coil 156 includes the second conductor layer 52 and third conductor layer 53, and has an equidistant two-stage structure in which the third conductor layer 53 overlies the second conductor layer 52 while interposing the lower interlayer insulating layer 35 therebetween. However, the upper thin-film coil 156 differs from the upper thin-film coil 155 in that it has photoresist layers 56 on both sides of the turn parts 52e, 52c and turn parts 53e, 53c, while the lower thin-film coil 155 has the photoresist layers 55, 55a at the center.

The main magnetic pole layer 126 and gap layer 127 differ from the main magnetic pole layer 26 and gap layer 27, respectively, in their forms. The main magnetic pole layer 126 differs from the main magnetic pole layer 26 in that it lacks the tilted surface and cutout.

The upper shield layer 170 differs from the upper shield layer 160 in that it has an opposing shield part 118 having a form different from that of the opposing shield part 61.

In thus constructed thin-film magnetic head 330, each of the lower thin-film coil 115 and upper thin-film coil 156 has an equidistant two-stage structure as in the thin-film magnetic head 320, and thus secures 4 turns, while having only 2 turns per plane. Therefore, as with the thin-film magnetic head 320, the thin-film magnetic head 330 can reduce the depth from the ABS 30, and make the magnetic path length as short as possible. Hence, the thin-film magnetic head 330 can follow rapid changes in recording signals having a high frequency and changing fast, and is suitable as a recording head for hard disk drives mounted to servers in particular.

Also, the thin-film magnetic head 330 can restrain the lower shield layer 40 and upper shield layer 170 from projecting as the lower and upper thin-film coils 115, 156 generate heat, and thus can approach recording media.

In the case of the thin-film magnetic head 330 in particular, the lower and upper thin-film coils 115, 156 have the photoresist layers 16, 56 on both sides of the turn parts. The photoresist layers 16, 56 are formed from an organic material and thus exhibit a coefficient of expansion greater than that of the lower and upper thin-film coils 115, 156. Therefore, the photoresist layers 16, 56 are easier to expand when heat is applied thereto. As compared with the thin-film magnetic head 320, the thin-film magnetic head 330 has more photoresist layers 16, 56, and thus is more likely to project the lower and upper shield layers 40, 170 as the photoresist layers 16, 56 expand.

However, the lower and upper thin-film coils 115, 156 can suppress the amount of heat generated, since they can secure 4 turns each and widen each turn part, while making the magnetic path length as short as possible. Therefore, while having large areas of photoresist layers 16, 56, the thin-film magnetic head 330 can restrain the lower and upper shield layers 40, 170 from projecting.

Fifth Embodiment

Figure 24:
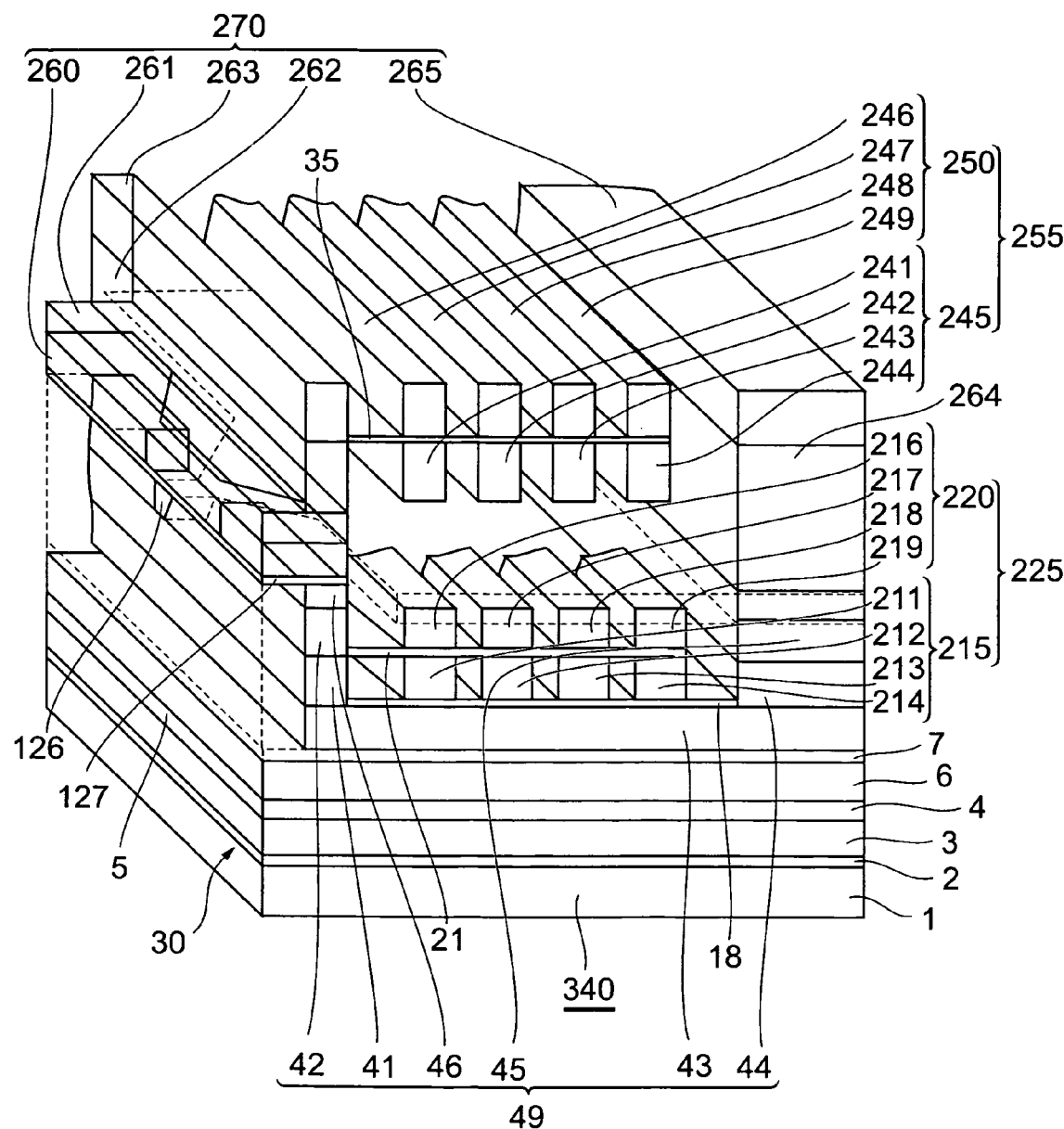
FIG. 24 is a perspective view showing a main structure of the thin-film magnetic head in accordance with a fifth embodiment of the present invention.

The structure of a thin-film magnetic head of perpendicular magnetic recording type in accordance with the fifth embodiment of the present invention will now be explained with reference to FIG. 24. FIG. 24 is a perspective view showing a main structure of the thin-film magnetic head 340 in accordance with the fifth embodiment of the present invention. FIG. 24 does not depict a part of insulating layers and photoresist layers.

As with the thin-film magnetic head 330, the thin-film magnetic head 340 comprises a substrate 1 and reproducing and recording heads laminated on the substrate 1, while having the ABS 30. The thin-film magnetic head 340 differs from the above-mentioned thin-film magnetic head 330 only in the configuration of the recording head. In the following explanations, configurations of the thin-film magnetic head 340 different from those of the thin-film magnetic head 330 will mainly be explained, while omitting or simplifying their common configurations.

The recording head differs from that of the thin-film magnetic head 330 in that it has a lower thin-film coil 225, an upper thin-film coil 255, a lower shield layer 49, and an upper shield layer 270.

The lower thin-film coil 225 includes a first conductor layer 215 and a second conductor layer 220, and has an equidistant two-stage structure in which the second conductor layer 220 overlies the first conductor layer 215 while interposing the lower interlayer insulating layer 21 therebetween. However, the first and second conductor layers 215, 220 have respective sets of four turn parts 211, 212, 213, 214; 216, 217, 218, 219 and are spirally wound about the main magnetic pole layer 126.

The upper thin-film coil 255 includes a first conductor layer 245 and a second conductor layer 250, and has an equidistant two-stage structure in which the second conductor layer 250 overlies the first conductor layer 245 while interposing the upper interlayer insulating layer 35 therebetween. However, the first and second conductor layers 245, 250 have respective sets of four turn parts 241, 242, 243, 244; 246, 247, 248, 249 and are spirally wound about the main magnetic pole layer 126.

The lower shield layer 49 differs from the lower shield layer 40 in that it has an opposing shield part 46. The opposing shield part 46 opposes an opposing shield part 260, which will be explained later, through the gap layer 127.

The upper shield layer 270 includes the opposing shield part 260, an intermediate shield part 261, first and second front shield parts 262, 263, an undepicted connecting shield part, and first and second rear shield parts 264, 265.

The first and second front shield parts 262, 263 are arranged on the ABS 30 side of the first and second conductor layers 245, 250, respectively. The second front shield part 263 overlies the first front shield part 262, so that the first and second front shield parts 262, 263 exhibit a two-stage structure.

The first and second rear shield parts 264, 265 are arranged at positions distanced more from the ABS 30 than are the first and second conductor layers 245, 250, respectively. The second rear shield part 265 overlies the first rear shield part 264, so that the first and second rear shield parts 264, 265 exhibit a two-stage structure. The intermediate shield part 261 is arranged between the opposing shield part 260 and first front shield part 262.

In thus constructed thin-film magnetic head 340, each of the lower and upper thin-film coils 225, 255 has an equidistant two-stage structure as in the thin-film magnetic head 300, and thus secures 8 turns, while having only 4 turns per plane. Though having as many as 8 turns, the thin-film magnetic head 340 can reduce the depth from the ABS 30, and make the magnetic path length as short as possible. Hence, the thin-film magnetic head 340 can follow rapid changes in recording signals having a high frequency and changing fast, and is suitable as a recording head for hard disk drives mounted to servers in particular.

Though each of the lower and upper thin-film coils 225, 255 has a (4+4) turn structure in the depicted thin-film magnetic head 340, their numbers of turns may be altered. The thin-film magnetic head 340 may have (3+3), (3+4), and (4+3) structures, for example.

Embodiments of Head Gimbal Assembly and Hard Disk Drive

Embodiments of the head gimbal assembly and hard disk drive will now be explained.

Figure 26:
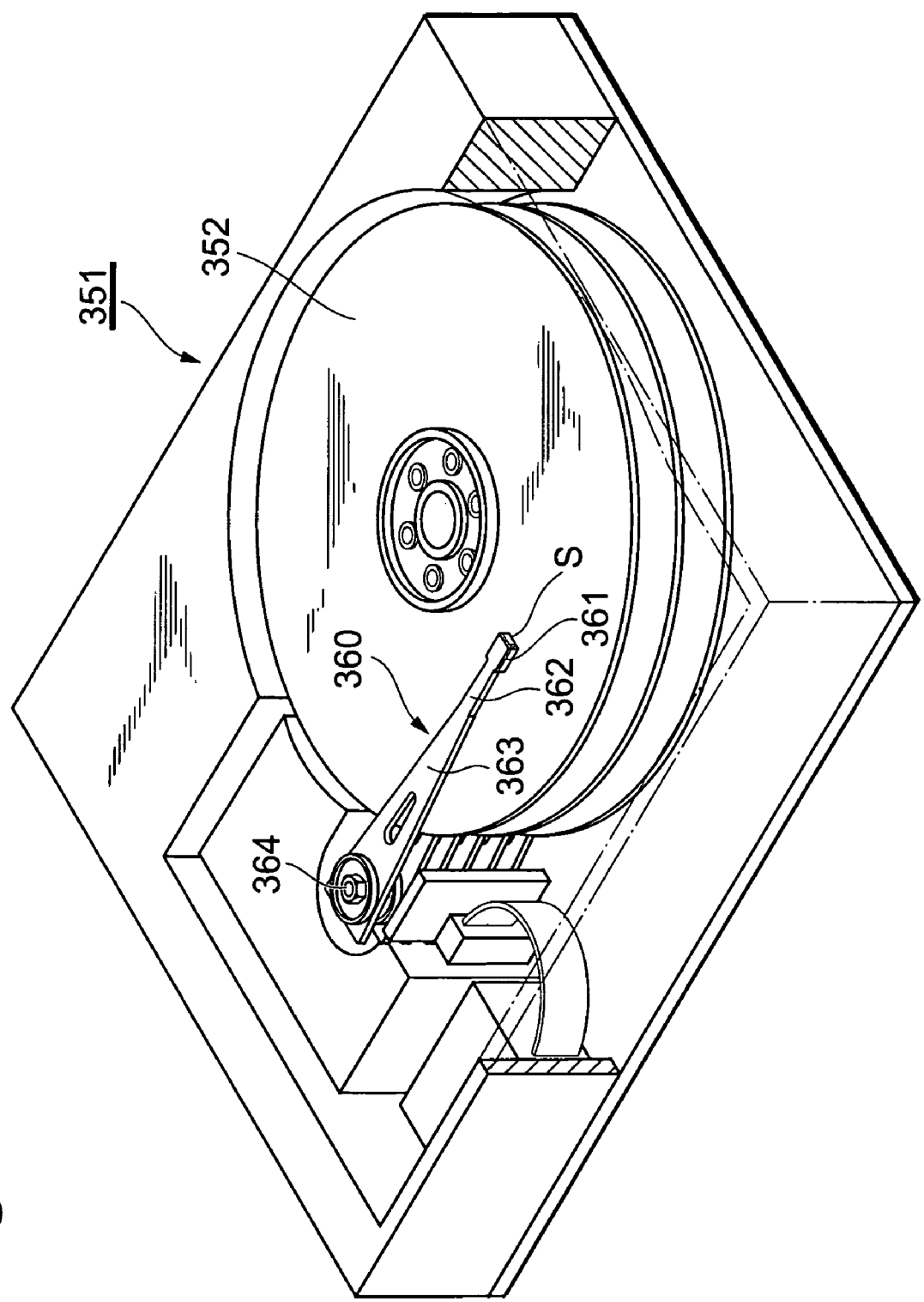
FIG. 26 is a perspective view showing a hard disk drive equipped with a thin-film magnetic head in accordance with an embodiment of the present invention.
Figure 27:
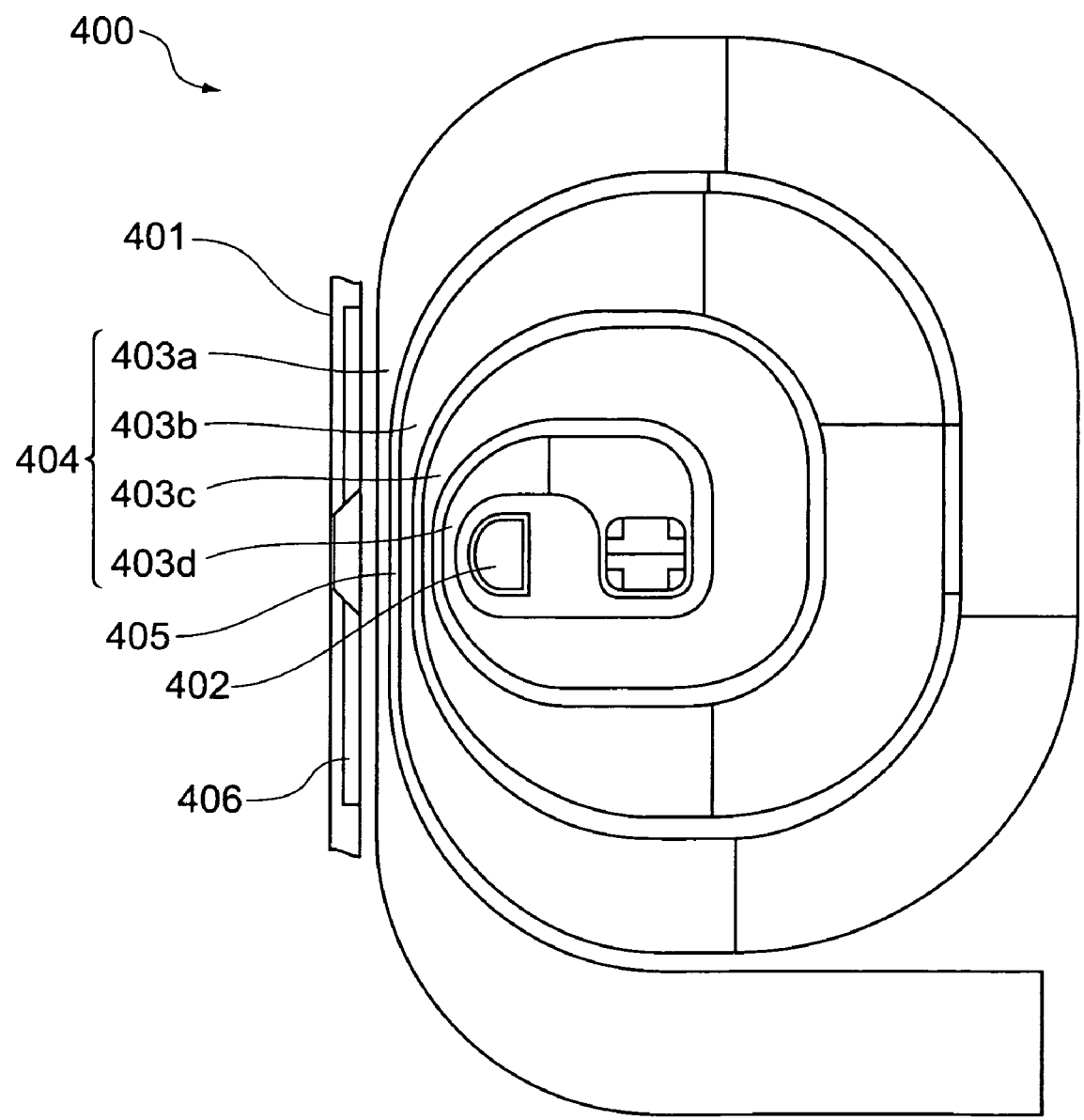
FIG. 27 is a plan view showing a thin-film coil and write shield layer in a conventional thin-film magnetic head.
Figure 28:
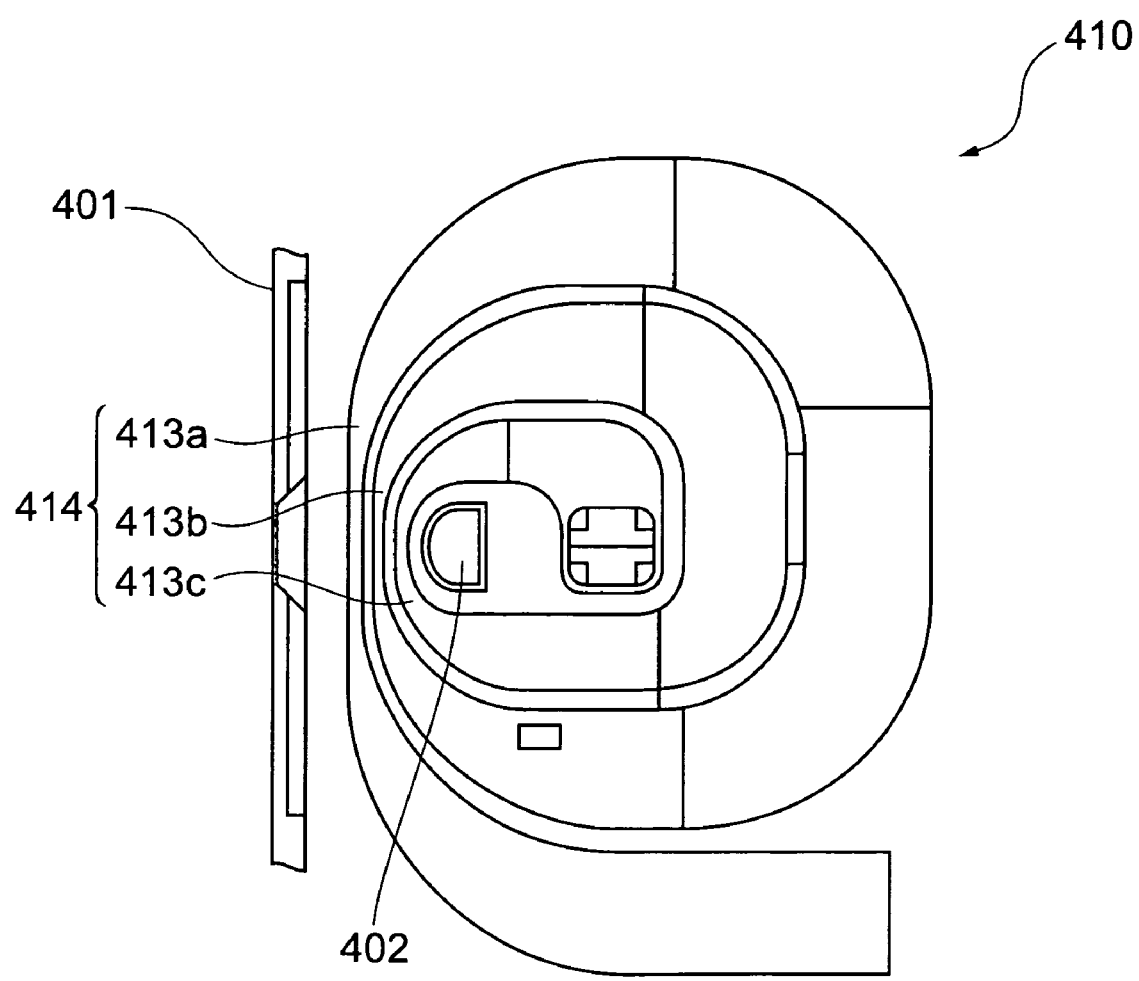
FIG. 28 is a plan view showing a thin-film coil and write shield layer in another conventional thin-film magnetic head.

FIG. 26 is a perspective view showing a hard disk drive 351 equipped with the above-mentioned thin-film magnetic head 300. The hard disk drive 351 includes a hard disk (recording medium) 352 rotating at a high speed and a head gimbal assembly (HGA) 360. The hard disk drive 351 is an apparatus which actuates the HGA 360, so as to record/reproduce magnetic information onto/from recording surfaces of the hard disk 352. The hard disk 352 has a plurality of (3 in the drawing) platters. Each platter has a recording surface opposing its corresponding thin-film magnetic head 300. In the HGA 360, a gimbal 362 mounted with a head slider 361 having a support formed with the thin-film magnetic head 300 and a suspension arm 363 supporting the gimbal 362 are arranged at the recording surface of each platter and can be rotated about a shaft 364 by a voice coil motor, for example, which is not depicted. When the HGA 360 is rotated, the head slider 361 moves in a radial direction of the hard disk 352, i.e., a direction traversing track lines.

Since such HGA 360 and hard disk drive 351 have the thin-film magnetic head 300, they can follow rapid changes in recording signals having a high frequency and changing fast, and are suitable for servers in particular. They can also reduce the flying height from the surface of the hard disk 352, thereby allowing the head slider 361 to approach the hard disk 352.

The above-mentioned first to fourth embodiments explain thin-film magnetic heads of a type (type 1) in which a thin-film coil is wound like a flat spiral about a write shield layer by way of example. The present invention is also applicable to thin-film magnetic heads of a type (type 2) in which a thin-film coil is wound about a main magnetic pole layer as in the fifth embodiment.

What is claimed is:

1. A thin-film magnetic head constructed such that a main magnetic pole layer having a magnetic pole end face on a side of a medium-opposing surface opposing a recording medium, a write shield layer opposing the main magnetic pole layer on the medium-opposing surface side, a gap layer formed between the main magnetic pole layer and write shield layer, and a thin-film coil wound about the write shield layer or main magnetic pole layer are laminated on a substrate;

wherein the thin-film coil has first and second conductor layers including turn parts arranged at a position separated from the medium-opposing surface; and wherein the thin-film magnetic head has an equidistant two-stage structure where a first turn part of the first conductor layer and a second turn part of the second conductor layer overlap vertically along the medium-opposing surface while having the same front distance from respective front side faces closer to the medium-opposing surface to the medium-opposing surface.

2. A thin-film magnetic head according to claim 1, wherein the first and second turn parts have the same rear side distance from respective rear side faces farther from the medium-opposing surface to the medium-opposing surface.

3. A thin-film magnetic head according to claim 2, wherein the number of the first turn parts differs from the number of the second turn parts in the first and second conductor layers, while one having a smaller number of the turn parts is formed thinner than the other.

4. A thin-film magnetic head according to claim 3, further comprising an interlayer insulating layer having a uniform thickness arranged between the first and second conductor layers.

5. A thin-film magnetic head according to claim 2, wherein the thin-film coil has upper and lower conductor groups, arranged at respective positions equidistant from the medium-opposing surface, opposing each other while holding the main magnetic pole layer therebetween, and wherein each of the upper and lower conductor groups has the first and second conductor layers.

6. A thin-film magnetic head according to claim 5, wherein the write shield layer has first and second front shield parts arranged closer to the medium-opposing surface than is the thin-film coil while overlapping vertically along the medium-opposing surface, and first and second rear shield parts arranged farther from the medium-opposing surface than is the thin-film coil while overlapping vertically along the medium-opposing surface, wherein the first conductor layer is arranged between the first front and rear shield parts, and wherein the second conductor layer is arranged between the second front and rear shield parts.

7. A thin-film magnetic head according to claim 6, further comprising a first intermediate insulating layer arranged between the first conductor layer and the first front and rear shield parts, and a second intermediate insulating layer arranged between the second conductor layer and the second front and rear shield parts, wherein each of the first and second intermediate insulating layers has a thickness of 0.02 to 0.3 μm.

8. A thin-film magnetic head according to claim 6, further comprising a first opposing insulating layer arranged closer to the medium-opposing surface than is the first front shield part, and a second opposing insulating layer arranged closer to the medium-opposing surface than is the second front shield part.

9. A thin-film magnetic head according to claim 6, wherein the first front shield part, first rear shield part, and first conductor layer have respective surfaces flush with each other, while the second front shield part, second rear shield part, and second conductor layer have respective surfaces flush with each other.

10. A thin-film magnetic head according to claim 2, further comprising an interlayer insulating layer having a uniform thickness arranged between the first and second conductor layers.

11. A thin-film magnetic head according to claim 2, wherein the first conductor layer has two first turn parts, wherein the second conductor layer has one second turn part, and wherein the second conductor layer is formed thinner than the first conductor layer.

12. A thin-film magnetic head according to claim 2, wherein the first and second turn parts are formed two each.

13. A method of manufacturing a thin-film magnetic head constructed such that a main magnetic pole layer having a magnetic pole end face on a side of a medium-opposing surface opposing a recording medium, a write shield layer opposing the main magnetic pole layer on the medium-opposing surface side, a gap layer formed between the main magnetic pole layer and write shield layer, and a thin-film coil wound about the write shield layer or main magnetic pole layer are laminated on a substrate;

the method comprising the steps of:
  forming a first conductor layer constituting the thin-film coil on a surface of a multilayer body and then forming an interlayer insulating layer on the first conductor layer; and
  forming a second conductor layer constituting the thin-film coil on the interlayer insulating layer at a position separated from the medium-opposing surface equidistantly as the first conductor layer.

14. A method of manufacturing a thin-film magnetic head according to claim 13, further comprising the steps of:
  forming first front and rear shield parts constituting the write shield layer on the surface of the multilayer body before forming the first conductor layer; and
  forming an intermediate insulating layer so as to cover the first front and rear shield parts;
  wherein the first conductor layer is formed between the first front and rear shield parts on the surface of the multilayer body.

15. A method of manufacturing a thin-film magnetic head according to claim 14, wherein an intermittent conductor layer provided with only one interstice is formed between the first front and rear shield parts when forming the first conductor layer between the first front and rear shield parts on the surface of the multilayer body.

16. A method of manufacturing a thin-film magnetic head according to claim 14, further comprising the steps of:
  forming an intermittent conductor layer provided with only one interstice between the first front and rear shield parts on the surface of the multilayer body; and
  forming a photosensitive resin layer at the interstice in the intermittent conductor layer and then forming a cover insulating film adapted to cover the surface of the multilayer body, and thereafter polishing the surface of the multilayer body until the first front and rear shield parts emerge, so as to form the first conductor layer between the first front and rear shield parts.

17. A method of manufacturing a thin-film magnetic head according to claim 16, further comprising the steps of
  forming second front and rear shield parts constituting the write shield layer on the surface of the multilayer body at positions separated from the medium-opposing surface equidistantly as the first front and rear shield parts, respectively, before forming the second conductor layer; and
  forming an intermediate insulating layer so as to cover the second front and rear shield parts;
  wherein the second conductor layer is formed between the second front and rear shield parts on the surface of the multilayer body.

18. A method of manufacturing a thin-film magnetic head according to claim 17, wherein a conductor layer is formed between the second front and rear shield parts, then a cover insulating film adapted to cover the surface of the multilayer body is formed, and thereafter the surface of the multilayer body is polished until the second front and rear shield parts emerge, so as to form the second conductor layer between the second front and rear shield parts.

19. A head gimbal assembly comprising a thin-film magnetic head formed on a support and a gimbal for securing the support;

wherein the thin-film magnetic head is constructed such that a main magnetic pole layer having a magnetic pole end face on a side of a medium-opposing surface opposing a recording medium, a write shield layer opposing the main magnetic pole layer on the medium-opposing surface side, a gap layer formed between the main magnetic pole layer and write shield layer, and a thin-film coil wound about the write shield layer or main magnetic pole layer are laminated on a substrate;

wherein the thin-film coil has first and second conductor layers including turn parts arranged at a position separated from the medium-opposing surface; and wherein the thin-film magnetic head has an equidistant two-stage structure where a first turn part of the first conductor layer and a second turn part of the second conductor layer overlap vertically along the medium-opposing surface while having the same front distance from respective front side faces closer to the medium-opposing surface to the medium-opposing surface.

20. A hard disk drive comprising a head gimbal assembly having a thin-film magnetic head and a recording medium opposing the thin-film magnetic head;

wherein the thin-film magnetic head is constructed such that a main magnetic pole layer having a magnetic pole end face on a side of a medium-opposing surface opposing a recording medium, a write shield layer opposing the main magnetic pole layer on the medium-opposing surface side, a gap layer formed between the main magnetic pole layer and write shield layer, and a thin-film coil wound about the write shield layer or main magnetic pole layer are laminated on a substrate;

wherein the thin-film coil has first and second conductor layers including turn parts arranged at a position separated from the medium-opposing surface; and wherein the thin-film magnetic head has an equidistant two-stage structure where a first turn part of the first conductor layer and a second turn part of the second conductor layer overlap vertically along the medium-opposing surface while having the same front distance from respective front side faces closer to the medium-opposing surface to the medium-opposing surface.

\* \* \* \* \*